United States Patent
Sakhnini et al.

(10) Patent No.: US 12,199,801 B2
(45) Date of Patent: Jan. 14, 2025

(54) OVERLAP EXTENSIONS AND WEIGHTING FUNCTIONS FOR COMMUNICATIONS WITH GUARD INTERVALS

(71) Applicant: QUALCOMM Incorporated, San Diego, CA (US)

(72) Inventors: Iyab Issam Sakhnini, San Diego, CA (US); Tao Luo, San Diego, CA (US); Hemant Saggar, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 18/050,770

(22) Filed: Oct. 28, 2022

(65) Prior Publication Data

US 2024/0146591 A1 May 2, 2024

(51) Int. Cl.
*H04L 27/26* (2006.01)
(52) U.S. Cl.
CPC .............................. *H04L 27/26025* (2021.01)
(58) Field of Classification Search
CPC ........... H04L 27/26025; H04L 27/2605; H04L 27/2607; H04L 27/2636; H04L 27/26265
See application file for complete search history.

(56) References Cited

U.S. PATENT DOCUMENTS

| | | | | |
|---|---|---|---|---|
| 8,503,366 B2 * | 8/2013 | Ikeda | ................... | H04L 27/2607 370/328 |
| 9,780,985 B1 * | 10/2017 | Tom | ....................... | H04L 5/0007 |
| 2004/0062212 A1 * | 4/2004 | Mandyam | ........... | H04L 27/2607 370/281 |
| 2008/0002645 A1 * | 1/2008 | Seki | ................... | H04L 25/03834 370/338 |
| 2011/0075756 A1 * | 3/2011 | Watanabe | ........... | H04L 27/2607 375/295 |
| 2015/0372843 A1 * | 12/2015 | Bala | ................... | H04L 27/26538 375/295 |

OTHER PUBLICATIONS

Qualcomm Incorporated, "Waveform Candidates", 3GPP TSG-RAN WG1 #84b, Apr. 11-15, 2016, Busan, Korea. (Year: 2016).*

(Continued)

*Primary Examiner* — Khanh C Tran
(74) *Attorney, Agent, or Firm* — Harrity & Harrity, LLP

(57) ABSTRACT

Various aspects of the present disclosure generally relate to wireless communication. In some aspects, a transmitting device may add a first extension before modulated symbols of a communication, the first extension including data from an end portion of the modulated symbols. The transmitting device may add a second extension after the modulated symbols, the second extension including data from a beginning portion of the modulated symbols. The transmitting device may apply a first weighting function that overlaps the first extension and the beginning portion of the modulated symbols. The transmitting device may apply a second weighting function that overlaps the end portion of the modulated symbols and the second extension. The transmitting device may add one or more of a header before the first extension or a tail after the second extension. The transmitting device may transmit the communication. Numerous other aspects are described.

19 Claims, 17 Drawing Sheets

(56) References Cited

OTHER PUBLICATIONS

Cruz-Roldán F., et al., "Intersymbol and Intercarrier Interference in OFDM Systems: Unified Formulation and Analysis", arxiv.org, Cornell University Library, 201 Olin Library Cornell University Ithaca, NY 14853, Dec. 8, 2020, Jan. 18, 2024, XP081832148, 10 Pages.
International Search Report and Written Opinion—PCT/US2023/031700—ISA/EPO—Jan. 18, 2024.
Qualcomm Incorporated: "Waveform Candidates", 3GPP TSH-RAN WG1 #84b, R1-162199, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016, 26 Pages, XP051080027, figures 2-13, 2-15, p. 5/3, line 12-p. 18/3, line 10.

\* cited by examiner

OVERLAP EXTENSIONS AND WEIGHTING FUNCTIONS FOR COMMUNICATIONS WITH GUARD INTERVALS

FIELD OF THE DISCLOSURE

Aspects of the present disclosure generally relate to wireless communication and to techniques and apparatuses for overlap extensions and weighting functions for communications with guard intervals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitting device. The method may include adding a first extension before modulated symbols of a communication, the first extension including data from an end portion of the modulated symbols. The method may include adding a second extension after the modulated symbols, the second extension including data from a beginning portion of the modulated symbols. The method may include applying a first weighting function that overlaps the first extension and the beginning portion of the modulated symbols. The method may include applying a second weighting function that overlaps the end portion of the modulated symbols and the second extension. The method may include adding one or more of a header before the first extension or a tail after the second extension. The method may include transmitting the communication.

Some aspects described herein relate to a method of wireless communication performed by a receiving device. The method may include adjusting a discrete Fourier transform (DFT) size of a communication or a quantity of modulated symbols of the communication. The method may include receiving the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The method may include removing the one or more of the header or the tail. The method may include removing the first extension and the second extension. The method may include demodulating the modulated symbols.

Some aspects described herein relate to a method of wireless communication performed by a transmitting device. The method may include adding a header before modulated symbols of a communication. The method may include adding a tail after the modulated symbols. The method may include adding an end extension after the tail, the end extension including one or more of data from a beginning portion of the modulated symbols or a first guard interval (GI). The method may include applying an end weighting function that overlaps the end extension and at least a portion of the tail. The method may include transmitting the communication.

Some aspects described herein relate to a method of wireless communication performed by a receiving device. The method may include adjusting a DFT size of a communication or a quantity of modulated symbols of a communication. The method may include receiving the communication that includes the modulated symbols, a tail, and an end extension after the modulated symbols that includes one or more of data from a beginning portion of the modulated symbols or a first GI. The method may include removing the tail. The method may include removing the end extension. The method may include demodulating the modulated symbols.

Some aspects described herein relate to a transmitting device for wireless communication. The transmitting device may include memory, one or more processors coupled to the memory, and instructions stored in the memory and executable by the one or more processors. The instructions may be executable by the one or more processors to cause the transmitting device to add a first extension before modulated symbols of a communication, the first extension including data from an end portion of the modulated symbols. The instructions may be executable by the one or more processors to cause the transmitting device to add a second extension after the modulated symbols, the second extension including data from a beginning portion of the modulated symbols. The instructions may be executable by the one or more processors to cause the transmitting device to apply a first weighting function that overlaps the first extension and the beginning portion of the modulated symbols. The instructions may be executable by the one or more processors to cause the transmitting device to apply a second weighting function that overlaps the end portion of the modulated symbols and the second extension. The instructions may be executable by the one or more processors to cause the transmitting device to add one or more of a header before the first extension or a tail after the second extension. The instructions may be executable by the one or more processors to cause the transmitting device to transmit the communication.

Some aspects described herein relate to a receiving device for wireless communication. The receiving device may include memory, one or more processors coupled to the memory, and instructions stored in the memory and executable by the one or more processors. The instructions may be executable by the one or more processors to cause the receiving device to adjust a DFT size of a communication or a quantity of modulated symbols of the communication. The instructions may be executable by the one or more processors to cause the receiving device to receive the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The instructions may be executable by the one or more processors to cause the receiving device to remove the one or more of the header or the tail. The instructions may be executable by the one or more processors to cause the receiving device to remove the first extension and the second extension. The instructions may be executable by the one or more processors to cause the receiving device to demodulate the modulated symbols.

Some aspects described herein relate to a transmitting device for wireless communication. The transmitting device may include memory, one or more processors coupled to the memory, and instructions stored in the memory and executable by the one or more processors. The instructions may be executable by the one or more processors to cause the transmitting device to add a header before modulated symbols of a communication. The instructions may be executable by the one or more processors to cause the transmitting device to add a tail after the modulated symbols. The instructions may be executable by the one or more processors to cause the transmitting device to add an end extension after the tail, the end extension including one or more of data from a beginning portion of the modulated symbols or a first GI. The instructions may be executable by the one or more processors to cause the transmitting device to apply an end weighting function that overlaps the end extension and at least a portion of the tail. The instructions may be executable by the one or more processors to cause the transmitting device to transmit the communication.

Some aspects described herein relate to a receiving device for wireless communication. The receiving device may include memory, one or more processors coupled to the memory, and instructions stored in the memory and executable by the one or more processors. The instructions may be executable by the one or more processors to cause the receiving device to adjust a DFT size of a communication or a quantity of modulated symbols of a communication. The instructions may be executable by the one or more processors to cause the receiving device to receive the communication that includes the modulated symbols, a tail, and an end extension after the modulated symbols that includes one or more of data from a beginning portion of the modulated symbols or a first GI. The instructions may be executable by the one or more processors to cause the receiving device to remove the tail. The instructions may be executable by the one or more processors to cause the receiving device to remove the end extension. The instructions may be executable by the one or more processors to cause the receiving device to demodulate the modulated symbols.

Some aspects described herein relate to a non-transitory computer-readable medium that stores one or more instructions for wireless communication by a transmitting device. The one or more instructions, when executed by one or more processors of the transmitting device, may cause the transmitting device to add a first extension before modulated symbols of a communication, the first extension including data from an end portion of the modulated symbols. The one or more instructions, when executed by one or more processors of the transmitting device, may cause the transmitting device to add a second extension after the modulated symbols, the second extension including data from a beginning portion of the modulated symbols. The one or more instructions, when executed by one or more processors of the transmitting device, may cause the transmitting device to apply a first weighting function that overlaps the first extension and the beginning portion of the modulated symbols. The one or more instructions, when executed by one or more processors of the transmitting device, may cause the transmitting device to apply a second weighting function that overlaps the end portion of the modulated symbols and the second extension. The one or more instructions, when executed by one or more processors of the transmitting device, may cause the transmitting device to add one or more of a header before the first extension or a tail after the second extension. The one or more instructions, when executed by one or more processors of the transmitting device, may cause the transmitting device to transmit the communication.

Some aspects described herein relate to a non-transitory computer-readable medium that stores one or more instructions for wireless communication by a receiving device. The one or more instructions, when executed by one or more processors of the receiving device, may cause the receiving device to adjust a DFT size of a communication or a quantity of modulated symbols of the communication. The one or more instructions, when executed by one or more processors of the receiving device, may cause the receiving device to receive the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The one or more instructions, when executed by one or more processors of the receiving device, may cause the receiving device to remove the one or more of the header or the tail. The one or more instructions, when executed by one or more processors of the receiving device, may cause the receiving device to remove the first extension and the second extension. The one or more instructions, when executed by one or more processors of the receiving device, may cause the receiving device to demodulate the modulated symbols.

Some aspects described herein relate to a non-transitory computer-readable medium that stores one or more instructions for wireless communication by a transmitting device. The one or more instructions, when executed by one or more processors of the transmitting device, may cause the transmitting device to add a header before modulated symbols of a communication. The one or more instructions, when executed by one or more processors of the transmitting device, may cause the transmitting device to add a tail after the modulated symbols. The one or more instructions, when executed by one or more processors of the transmitting device, may cause the transmitting device to add an end extension after the tail, the end extension including one or more of data from a beginning portion of the modulated symbols or a first GI. The one or more instructions, when executed by one or more processors of the transmitting device, may cause the transmitting device to apply an end weighting function that overlaps the end extension and at least a portion of the tail. The one or more instructions, when executed by one or more processors of the transmitting device, may cause the transmitting device to transmit the communication.

Some aspects described herein relate to a non-transitory computer-readable medium that stores one or more instructions for wireless communication by a receiving device. The one or more instructions, when executed by one or more processors of the receiving device, may cause the receiving device to adjust a DFT size of a communication or a quantity of modulated symbols of a communication. The one or more instructions, when executed by one or more processors of the receiving device, may cause the receiving device to receive the communication that includes the modulated symbols, a tail, and an end extension after the modulated symbols that includes one or more of data from a beginning portion of the modulated symbols or a first GI. The one or more instructions, when executed by one or more processors of the receiving device, may cause the receiving device to remove the tail. The one or more instructions, when executed by one or more processors of the receiving device, may cause the receiving device to remove the end extension. The one or more instructions, when executed by one or more processors of the receiving device, may cause the receiving device to demodulate the modulated symbols.

Some aspects described herein relate to an apparatus for wireless communication. The apparatus may include means for adding a first extension before modulated symbols of a communication, the first extension including data from an end portion of the modulated symbols. The apparatus may include means for adding a second extension after the modulated symbols, the second extension including data from a beginning portion of the modulated symbols. The apparatus may include means for applying a first weighting function that overlaps the first extension and the beginning portion of the modulated symbols. The apparatus may include means for applying a second weighting function that overlaps the end portion of the modulated symbols and the second extension. The apparatus may include means for adding one or more of a header before the first extension or a tail after the second extension. The apparatus may include means for transmitting the communication.

Some aspects described herein relate to an apparatus for wireless communication. The apparatus may include means for adjusting a DFT size of a communication or a quantity of modulated symbols of the communication. The apparatus may include means for receiving the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The apparatus may include means for removing the one or more of the header or the tail. The apparatus may include means for removing the first extension and the second extension. The apparatus may include means for demodulating the modulated symbols.

Some aspects described herein relate to an apparatus for wireless communication. The apparatus may include means for adding a header before modulated symbols of a communication. The apparatus may include means for adding a tail after the modulated symbols. The apparatus may include means for adding an end extension after the tail, the end extension including one or more of data from a beginning portion of the modulated symbols or a first GI. The apparatus may include means for applying an end weighting function that overlaps the end extension and at least a portion of the tail. The apparatus may include means for transmitting the communication.

Some aspects described herein relate to an apparatus for wireless communication. The apparatus may include means for adjusting a DFT size of a communication or a quantity of modulated symbols of a communication. The apparatus may include means for receiving the communication that includes the modulated symbols, a tail, and an end extension after the modulated symbols that includes one or more of data from a beginning portion of the modulated symbols or a first GI. The apparatus may include means for removing the tail. The apparatus may include means for removing the end extension. The apparatus may include means for demodulating the modulated symbols.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
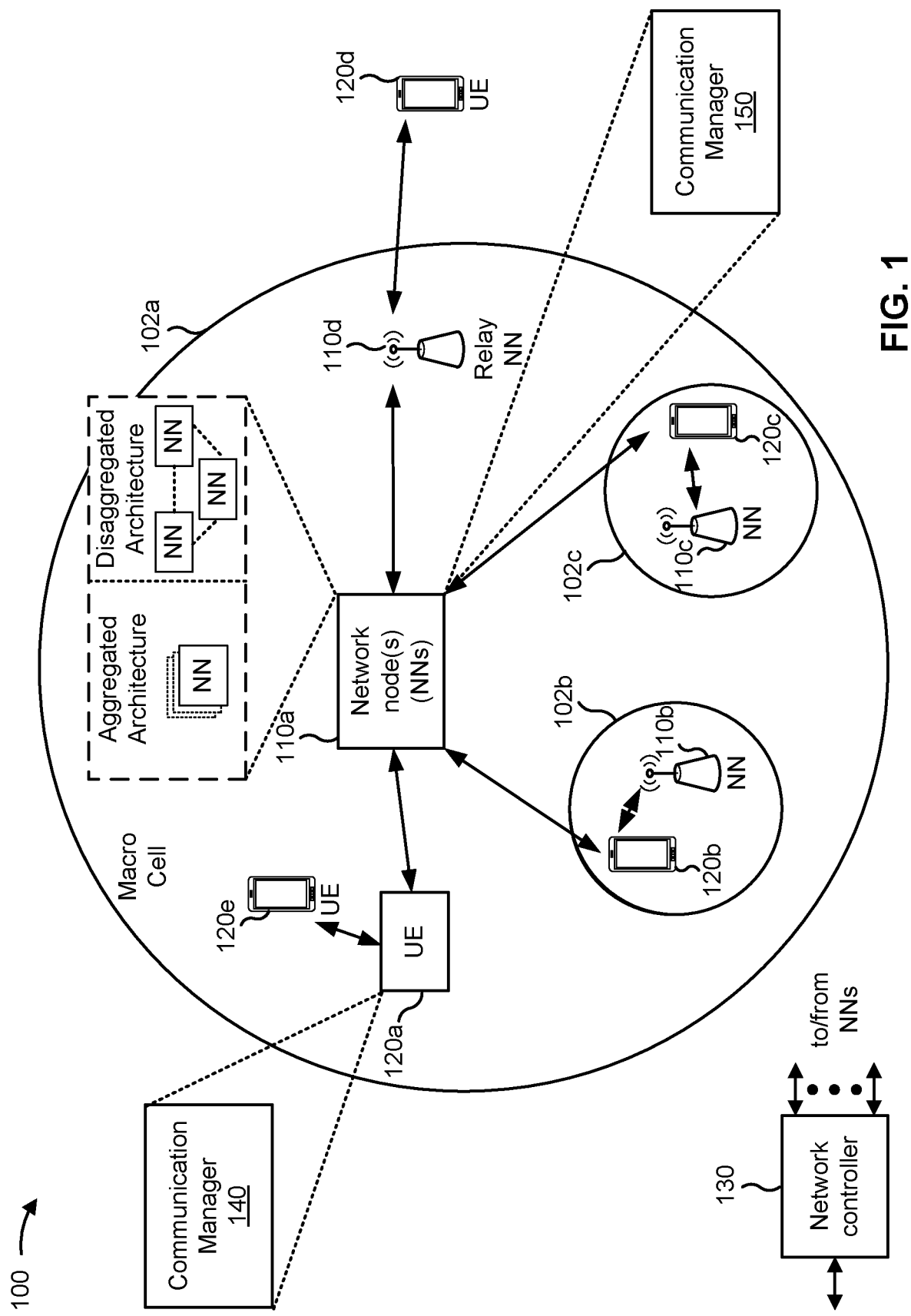
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., LTE) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station," "network entity," or "network node" may refer to an aggregated base station, a disaggregated base station, an integrated access and backhaul (IAB) node, a relay node, or one or more components thereof. For example, in some aspects, "base station," "network entity," or "network node" may refer to a CU, a DU, an RU, a Near-Real Time (Near-RT) RAN Intelligent Controller (MC), or a Non-Real Time (Non-RT) RIC, or a combination thereof. In some aspects, the terms "base station," "network entity," or "network node" may refer to one device configured to perform one or more functions, such as those described herein in connection with the network node 110. In some aspects, the terms "base station," "network entity," or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station," "network entity," or "network node" may refer to any one or more of those different devices. In some aspects, the terms "base station," "network entity," or "network node" may refer to one or more virtual base stations or one or more virtual base station functions. For example, in some aspects, two or more base station functions may be instantiated on a single device. In some aspects, the terms "base station," "network entity," or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a transmitting device (e.g., a UE 120, a network node 110) may include a communication manager 140 or 150. As described in more detail elsewhere herein, the communication manager 140 or 150 may add a first extension before modulated symbols of a communication, the first extension including data from an end portion of the modulated symbols. The communication manager 140 or 150 may add a second extension after the modulated symbols, the second extension including data from a beginning portion of the modulated symbols. The communication manager 140 or 50 may apply a first weighting function that overlaps the first extension and the beginning portion of the modulated symbols and apply a second weighting function that overlaps the end portion of the modulated symbols and the second extension. The communication manager 140 or 150 may add one or more of a header before the first extension or a tail after the second extension and transmit the communication.

In some aspects, a receiving device (e.g., a UE 120, a network node 110) may include a communication manager 140 or 150. As described in more detail elsewhere herein, the communication manager 140 or 150 may adjust a discrete Fourier transform (DFT) size of a communication or a quantity of modulated symbols of the communication/The communication manager 140 or 150 may receive the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The communication manager 140 or 150 may remove the one or more of the header or the tail and remove the first extension and the second extension; and demodulate the modulated symbols.

In some aspects, the communication manager 140 or 150 may add a header before modulated symbols of a communication and add a tail after the modulated symbols. The communication manager 140 or 50 may add an end extension after the tail, the end extension including one or more of data from a beginning portion of the modulated symbols or a first guard interval (GI). The communication manager 140 or 150 may apply an end weighting function that overlaps the end extension and at least a portion of the tail and transmit the communication.

In some aspects, the communication manager 140 or 150 may adjust a DFT size of a communication or a quantity of modulated symbols of a communication/The communication manager 140 or 150 may receive the communication that includes the modulated symbols, a tail, and an end extension after the modulated symbols that includes one or more of data from a beginning portion of the modulated symbols or a first GI. The communication manager 140 or 150 may remove the tail, remove the end extension, and demodulate the modulated symbols. Additionally, or alternatively, the communication manager 140 or 150 may perform one or more other operations described herein.

As indicated above, FIG. 1 is provided as an example. Other examples may differ from what is described with regard to FIG. 1.

Figure 2:
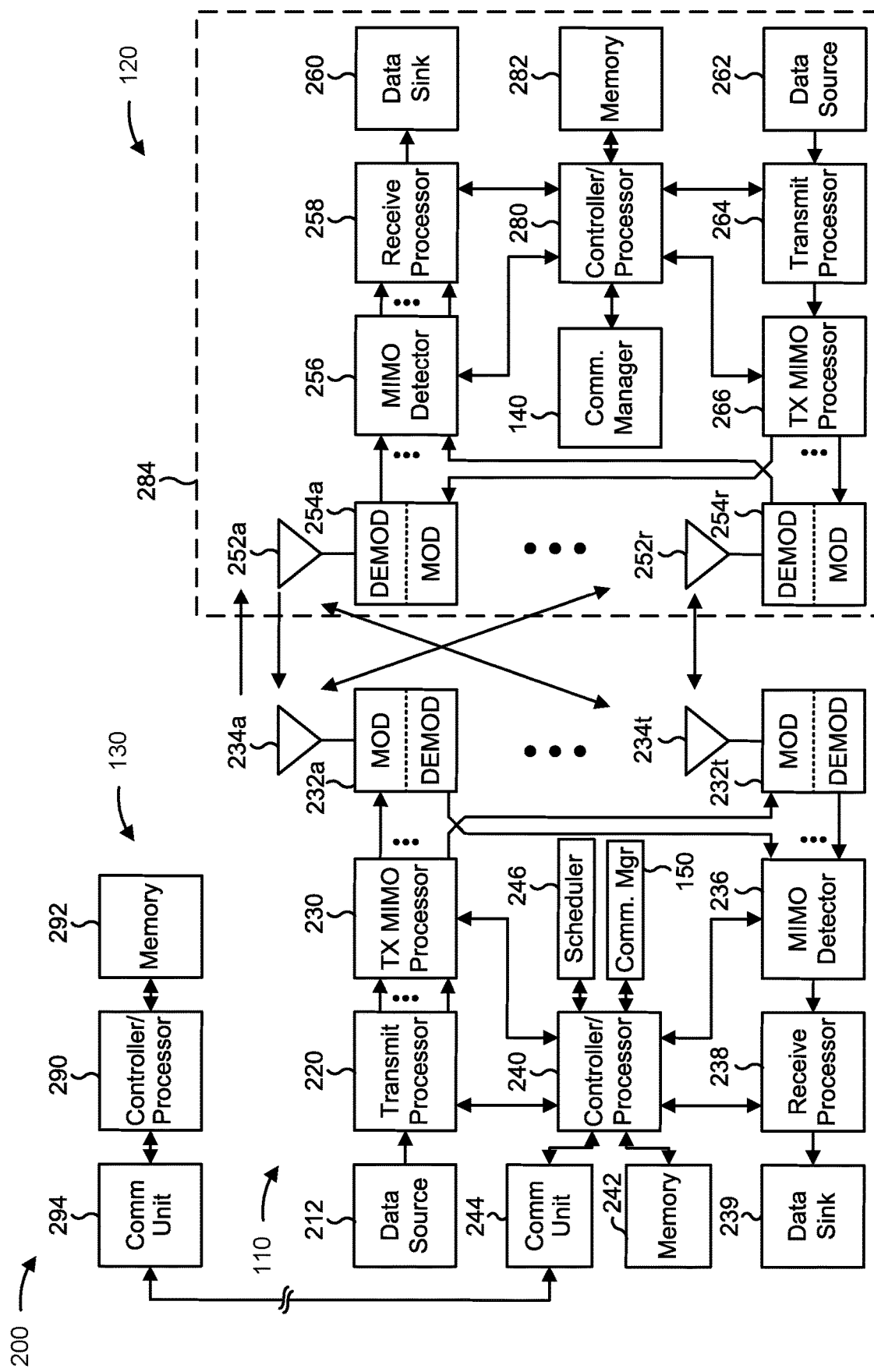
FIG. 2 is a diagram illustrating an example of a network entity (e.g., network node) in communication with a user equipment (UE) in a wireless network, in accordance with the present disclosure.

FIG. 2 is a diagram illustrating an example 200 of a network entity (e.g., network node 110) in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-17).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-17).

The controller/processor of a network entity (e.g., controller/processor 240 of the network node 110), the controller/processor 280 of the UE 120, and/or any other component(s) of FIG. 2 may perform one or more techniques associated with windowing for GI-based waveform communications, as described in more detail elsewhere herein. In some aspects, the transmitting device described herein is a network entity (e.g., network node 110) or a UE (e.g., UE 120), is included in the network entity or UE 120, or includes one or more components of the network node 110 or UE 120 shown in FIG. 2. In some aspects, the receiving device described herein is a network entity (e.g., network node 110) or a UE (e.g., UE 120), is included in the network entity or UE 120, or includes one or more components of the network node 110 or UE 120 shown in FIG. 2. For example, the controller/processor 240 of the network node 110, the controller/processor 280 of the UE 120, and/or any other component(s) of FIG. 2 may perform or direct operations of, for example, process 1200 of FIG. 12, process 1300 of FIG. 13, process 1400 of FIG. 14, process 1500 of FIG. 15, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1200 of FIG. 12, process 1300 of FIG. 13, process 1400 of FIG. 14, process 1500 of FIG. 15, and/or other processes as described herein. In some examples, executing instructions may include running the instructions, converting the instructions, compiling the instructions, and/or interpreting the instructions, among other examples.

In some aspects, a transmitting device (e.g., a network entity, UE 120) includes means for adding a first extension before modulated symbols of a communication, the first extension including data from an end portion of the modulated symbols; means for adding a second extension after the modulated symbols, the second extension including data from a beginning portion of the modulated symbols; means for applying a first weighting function that overlaps the first extension and the beginning portion of the modulated symbols; means for applying a second weighting function that overlaps the end portion of the modulated symbols and the second extension; means for adding one or more of a header before the first extension or a tail after the second extension; and/or means for transmitting the communication. In some aspects, the means for the transmitting device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the transmitting device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a receiving device (e.g., a network entity, UE 120) includes means for adjusting a DFT size of a communication or a quantity of modulated symbols of the communication; means for receiving the communication, the communication including the modulated symbols, a first extension before the modulated symbols that includes data from an end portion of the modulated symbols, a second extension after the modulated symbols that includes data from a beginning portion of the modulated symbols, and one or more of a header or a tail; means for removing the one or more of the header or the tail; means for removing the first extension and the second extension; and/or means for demodulating the modulated symbols. In some aspects, the means for the receiving device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the receiving device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the transmitting device includes means for adding a header before modulated symbols of a communication; means for adding a tail after the modulated symbols; means for adding an end extension after the tail, the end extension including one or more of data from a beginning portion of the modulated symbols or a first GI; means for applying an end weighting function that overlaps the end extension and at least a portion of the tail; and/or means for transmitting the communication.

In some aspects, the receiving device includes means for adjusting a DFT size of a communication or a quantity of modulated symbols of a communication; means for receiving the communication that includes the modulated symbols, a tail, and an end extension after the modulated symbols that includes one or more of data from a beginning portion of the modulated symbols or a first GI; means for removing the tail; means for removing the end extension; and/or means for demodulating the modulated symbols.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
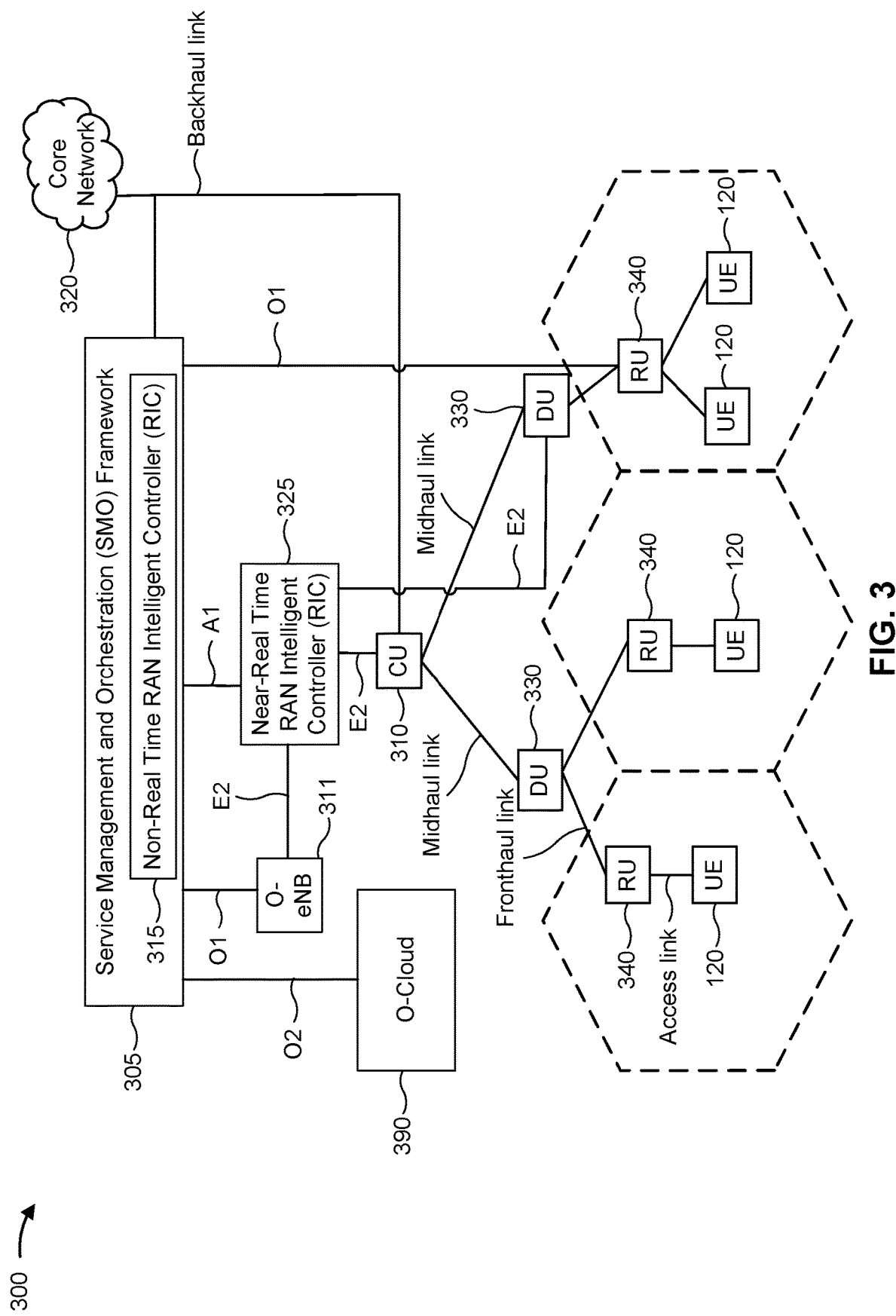
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT MC 325 via an E2 link, or a Non-RT MC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitting device or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (IFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an IFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
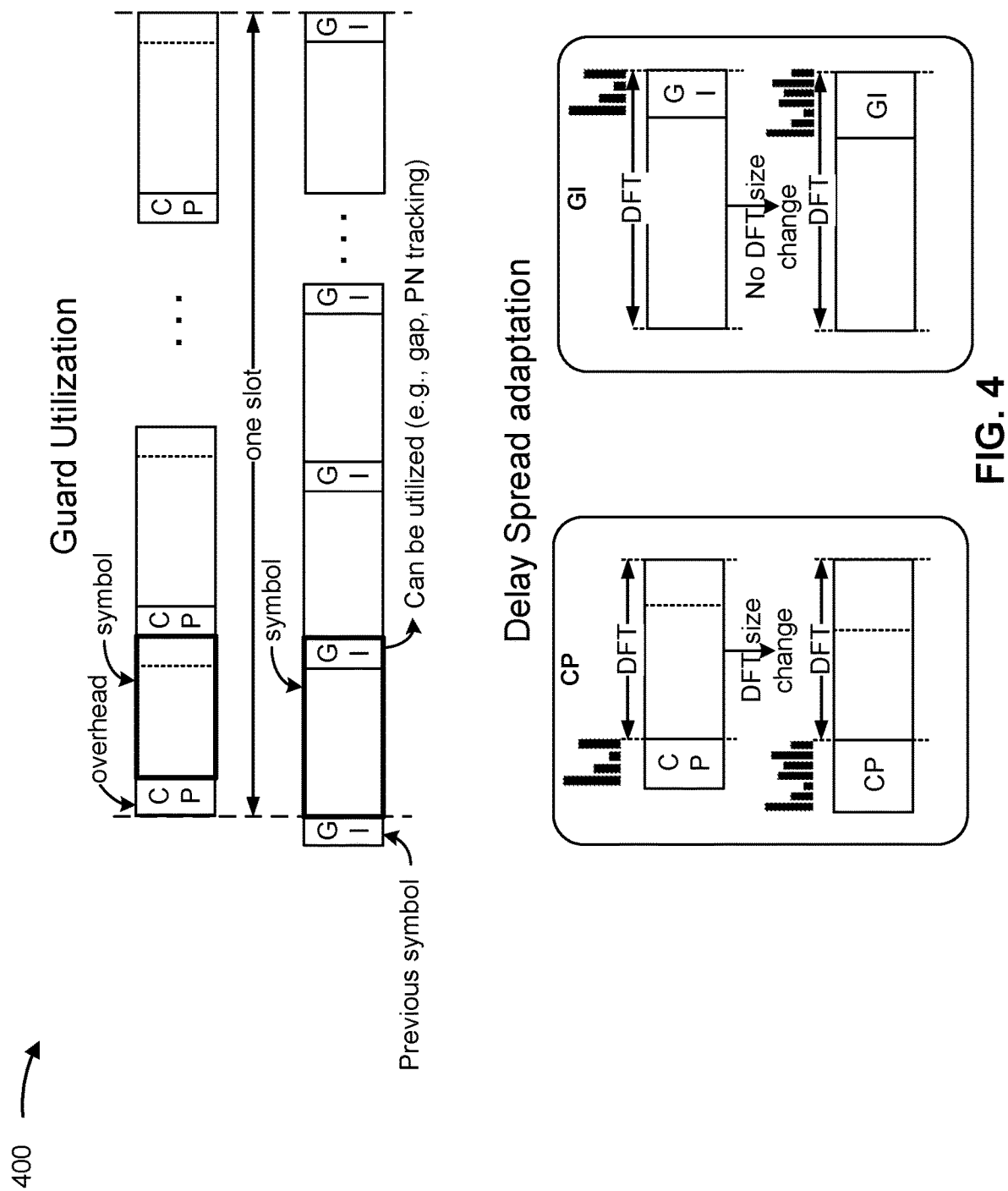
FIG. 4 is a diagram illustrating an example of a cyclic prefix and a guard interval (GI) for single carrier waveforms, in accordance with the present disclosure.

FIG. 4 is a diagram illustrating an example 400 of a cyclic prefix (CP) and a GI for single carrier (SC) waveforms, in accordance with the present disclosure.

A transmitting device, such as the UE 120 or a network entity (e.g., network node 110), may include a short amount of data or space between symbols to mitigate interference between neighboring symbols. The short amount of data may be a CP, or a prefixing of a symbol, as shown in example 400. The CP may also provide an opportunity for a beam to switch between symbols. The CP may be contained within a slot boundary, may include random data, and may not be easily adaptable to delay spread, which is a difference between arrival of an earliest multi-path component and arrival of a last multi-path component. CPs may be of different lengths. CP is adopted in LTE and NR, and CP is adopted for WiFi OFDM symbols.

The transmitting device may also use a GI between symbols. The GI may be a specified period of time between symbols, to mitigate interference between the symbols. The GI may be a known sequence that can be utilized for synchronizing phase tracking. The GI may be of uniform length across symbols. The GI may be more resource efficient than a CP. The GI may adapt to delay spreads without changing a symbol duration. The GI may be adopted for use with WiFi for SC frequency domain equalization (FDE) (SC-FDE).

The transmitting device may use signal processing to generate a waveform for data content. The signal processing may involve linear convolution, which is an operation to calculate the output for a linear time invariant system. Linear convolution may use an FFT operation. A CP and a GI may both convert a linear convolution of transmitted symbols to a circular convolution, with a simple one-tap FDE at the receiver. Circular convolution calculates the output for a linear time invariant system but is periodic and utilizes the periodicity of samples in DFT. A CP and a GI may also help to maintain symbol and slot alignment.

While a CP may be symbol contained, a GI may not be. While a CP may have perfect circular convolution, there may be some data leakage on a GI. The overhead for a CP may be about 7% in NR and may be utilized for a CP. A CP may need an FFT size change, but a GI may not need an FFT size change.

As indicated above, FIG. 4 is provided as an example. Other examples may differ from what is described with regard to FIG. 4.

Figure 5:
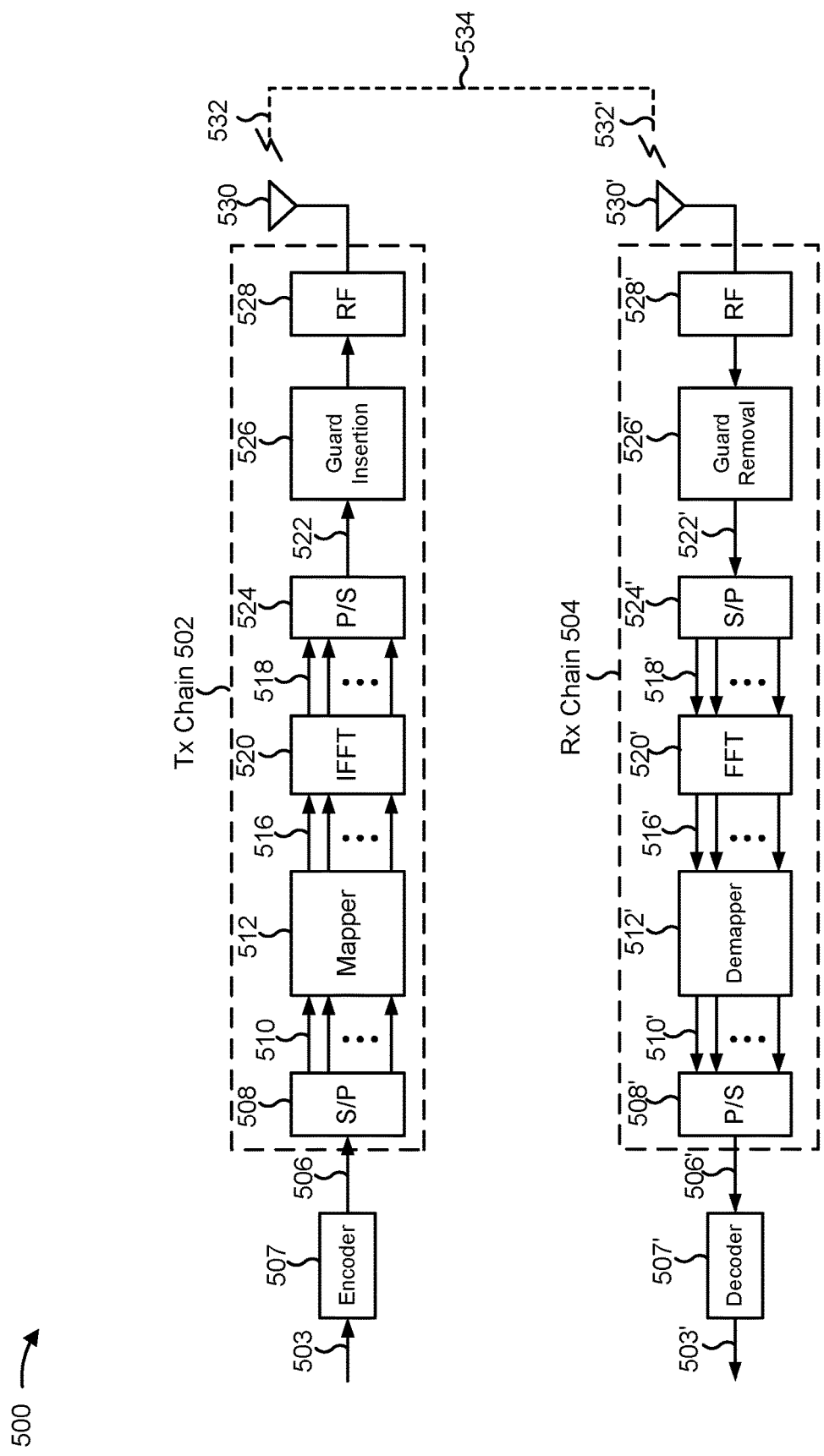
FIG. 5 is a diagram illustrating an example of a transmit chain and a receive chain of a wireless communication device, in accordance with the present disclosure.

FIG. 5 is a diagram illustrating an example 500 of a transmit (Tx) chain 502 and a receive (Rx) chain 504 of a wireless communication device, in accordance with the present disclosure. The wireless communication device may be a network entity (e.g., network node 110 depicted in FIGS. 1-2) or a UE (e.g., UE 120). In some aspects, one or more components of Tx chain 502 may be implemented in transmit processor 264, TX MIMO processor 266, MOD/DEMOD 254, and/or controller/processor 280, as described above in connection with FIG. 2. In some aspects, Tx chain 502 may be implemented in the UE 120 for transmitting data 506 (e.g., uplink data, an uplink reference signal, uplink control information) to network node 110 on an uplink channel. In some aspects, one or more components of Tx chain 502 may be implemented in transmit processor 220, TX MIMO processor 230, MOD/DEMOD 234, and/or controller/processor 240, as described above in connection with FIG. 2. In some aspects, Tx chain 502 may be implemented in the network node 110 for transmitting data 506 (e.g., uplink data, an uplink reference signal, uplink control information, and/or the like) to the UE 120 on a downlink channel.

An encoder 507 may alter a signal (e.g., a bitstream) 503 into data 506. Data 506 to be transmitted is provided from encoder 507 as input to a serial-to-parallel (S/P) converter 508. In some aspects, S/P converter 508 may split the transmission data into N parallel data streams 510.

The N parallel data streams 510 may then be provided as input to a mapper 512. Mapper 512 may map the N parallel data streams 510 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 512 may output N parallel symbol streams 516, each symbol stream 516 corresponding to one of N orthogonal subcarriers of an IFFT component 520. These N parallel symbol streams 516 are represented in the frequency domain and may be converted into N parallel time domain sample streams 518 by IFFT component 520.

In some aspects, N parallel modulations in the frequency domain correspond to N modulation symbols in the frequency domain, which correspond to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 518 may be converted into an OFDM/OFDMA symbol stream 522 by a parallel-to-serial (P/S) converter 524. A guard insertion component 526 may insert a GI between successive OFDM/OFDMA symbols in the OFDM/OFDMA symbol stream 522. The output of guard insertion component 526 may then be upconverted to a desired transmit frequency band by an RF front end 528. An antenna 530 may then transmit the resulting signal 532.

In some aspects, Rx chain 504 may utilize OFDM/OFDMA. In some aspects, one or more components of Rx chain 504 may be implemented in receive processor 258, MIMO detector 256, MOD/DEMOD 254, and/or controller/processor 280, as described above in connection with FIG. 2. In some aspects, Rx chain 504 may be implemented in the UE 120 for receiving data 506 (e.g., downlink data, a downlink reference signal, downlink control information, and/or the like) from the network node 110 on a downlink channel. In some aspects, one or more components of Rx chain 504 may be implemented in receive processor 238, MIMO detector 236, MOD/DEMOD 234, and/or controller/processor 240, as described above in connection with FIG. 2. In some aspects, Rx chain 504 may be implemented in the network node 110 for receiving data 506 (e.g., uplink data, an uplink reference signal, uplink control information, and/or the like) from the UE 120 on an uplink channel.

A transmitted signal 532 is shown traveling over a wireless channel 534 from Tx chain 502 to Rx chain 504. When a signal 532' is received by an antenna 530', the received signal 532' may be downconverted to a baseband signal by an RF front end 528'. A guard removal component 526' may then remove the GI that was inserted between OFDM/OFDMA symbols by guard insertion component 526.

The output of guard removal component 526' may be provided to an S/P converter 524'. The output may include an OFDM/OFDMA symbol stream 522', and S/P converter 524' may divide the OFDM/OFDMA symbol stream 522' into N parallel time-domain symbol streams 518', each of which corresponds to one of the N orthogonal subcarriers. An FFT component 520' may convert the N parallel time-domain symbol streams 518' into the frequency domain and output N parallel frequency-domain symbol streams 516'.

A demapper 512' may perform the inverse of the symbol mapping operation that was performed by mapper 512, thereby outputting N parallel data streams 510'. A P/S converter 508' may combine the N parallel data streams 510' into a single data stream 506'. Ideally, data stream 506' corresponds to data 506 that was provided as input to Tx chain 502. Data stream 506' may be decoded into a decoded data stream 503' by decoder 507'.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

As indicated above, FIG. 5 is provided as an example. Other examples may differ from what is described with regard to FIG. 5.

Figure 6:
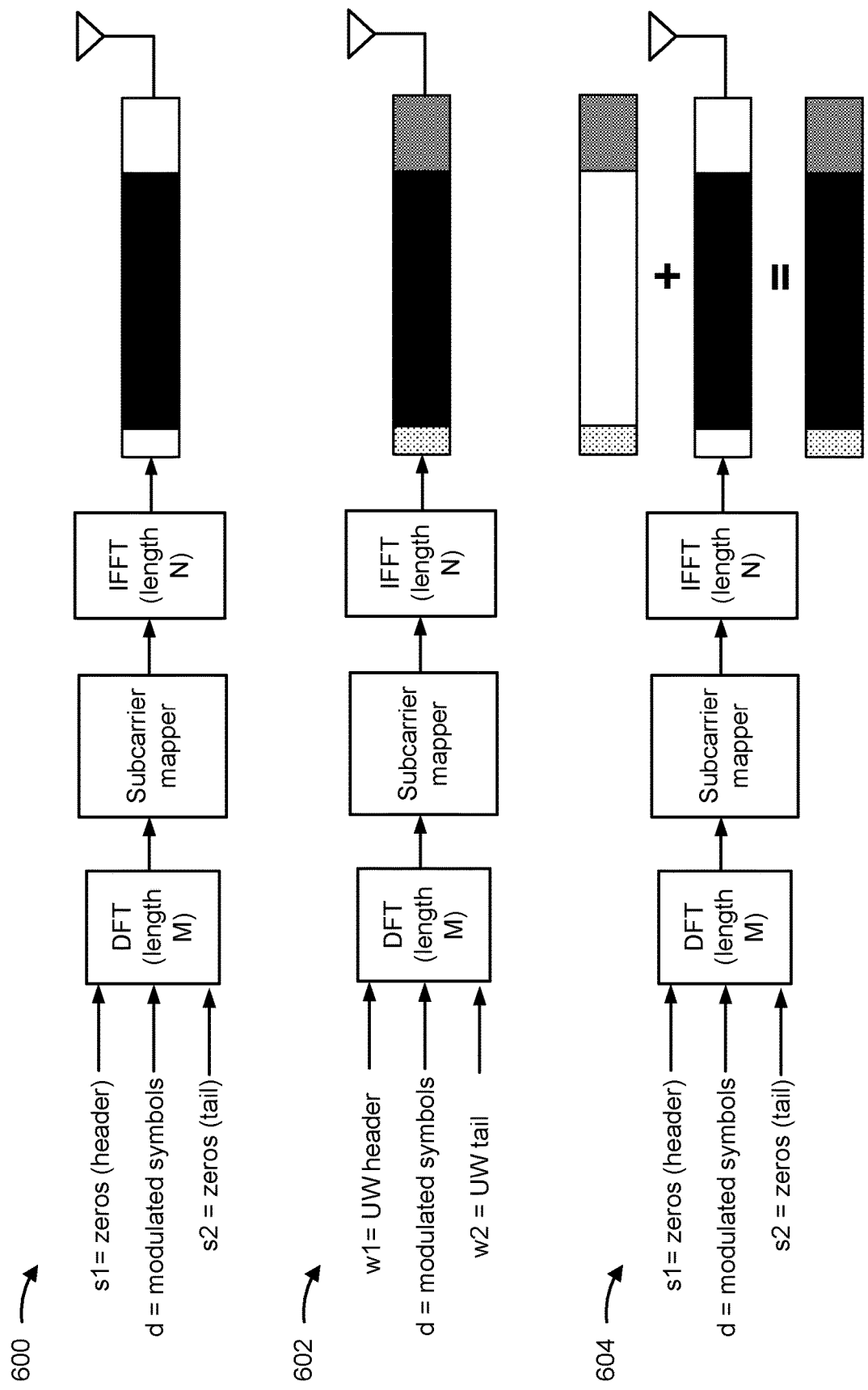
FIG. 6 is a diagram illustrating examples of generating a GI-based waveform with a suppressed tail, in accordance with the present disclosure.

FIG. 6 is a diagram illustrating examples 600, 602, and 604 of generating a GI-based waveform with a suppressed tail, in accordance with the present disclosure.

An NR network may use large bandwidths for operating in high frequency bands. Several types of waveforms may be used for large bandwidth communications. One type of waveform be a CP-OFDM waveform that is CP-based, has a higher complexity, a single tap FDE, an efficient bandwidth utilization, easy frequency division multiplexing (FDM), increased subcarrier spacing (SCS), and/or a higher order MIMO. Another type of waveform may include an SC frequency domain waveform, such as a DFT-s-OFDM waveform, with similar characteristics. SC frequency domain waveforms may have a low peak-to-average power ratio (PAPR) for better coverage and/or efficient bandwidth utilization (no guard band may be necessary). SC time domain waveforms may also have low FFT complexity. On the other hand, OFDM waveforms may have efficient bandwidth utilization but with a higher PAPR and a higher spectral efficiency.

Some communications in these waveforms may use a CP to help eliminate inter-symbol interference. The CP may be a repetition of information from a previous symbol that is used as a guard against inter-symbol interference (ISI).

Another type of waveform is a GI-based waveform, which can adapt to different delay spread without changing symbol duration and achieve better resource utilization. The GI-based waveform may be extended to DFT-s-OFDM. Some solutions may produce zero-tail (ZT) DFT-s-OFDM signals by adding zeros prior to DFT input. The resulting communication may include data content and tail samples at the end to help mitigate interference. Another waveform may be a time domain (TD) SC quadrature amplitude modulation (SC-QAM) with CP or GI and a lower complexity. This may involve FDE or time domain equalization (TDE) and a guard band and/or FDM with guard bands. An SC-QAM waveform may be optimal for a lower signal-to-noise ratio (SNR) and may involve TD for a lower PAPR. Higher bands may have a higher phase noise, expect a lower PAPR, and/or a possible UE complexity increase.

Example 600 shows data and zeros that are input into an M-point DFT to help create zero tails for DFT-s-OFDM. The DFT output proceeds through a subcarrier mapper and an N-point IFFT. Example 600 further shows that Zadoff-Chu (ZC) sequences can be added as GI sequences after an IFFT output. The receiver may subtract the impact of any GI sequences. While known signals may be used for GI sequences, to achieve flexible adaptation to delay spread and to enable tracking, such GIs still suffer from the imperfection on the circular property for FFT operation. The GI sequences may be utilized in only the IFFT domain. That is, the receiver may have to perform FFT, equalization, and then return to IFFT. These additional computations may consume processing resources.

The GI-based waveform may be generated by performing calculations for an IFFT operation. For example, a value A may represent the IFFT operation ($F^H$) to be performed with DFT matrix D, shown by $$\begin{bmatrix} d \\ s \\ w \end{bmatrix},$$

with separate inputs for data (d), tail suppression samples (s), and a GI sequence (w). A may be equal to $F^H BD$, where matrix B represents subcarrier mapping. The IFFT output x may be found by:

$$x = A \begin{bmatrix} d \\ s \\ w \end{bmatrix} = \begin{bmatrix} M_{11} & M_{12} & M_{13} \\ M_{21} & M_{22} & M_{23} \end{bmatrix} \begin{bmatrix} d \\ s \\ w \end{bmatrix} = \begin{bmatrix} x_{non-tail} \\ x_{tail} \end{bmatrix}$$

To reduce data leakage to the GI sequence, the UE 120 may select a value for the tail suppression samples s, such that $M_{22}s + M_{21}d = 0$. For example, the UE 120 may use $s = -M_{22}^{-1} * M_{21} * d$. That is, the UE 120 may select the tail suppression samples s to have a negative value that is based at least in part on a product of an inverse of a second tail matrix component ($M_{22}$), a first tail matrix component ($M_{21}$), and a value of d. The UE 120 may select the value of s for each symbol. The UE 120 may not need to completely remove the impact from d to x tail. As long as $M_{22}s + M_{21}d$ is substantially smaller than $M_{23}w$, the UE 120 may be considered to have maintained the cyclic structure. This enables the UE 120 to have more flexibility in selecting s and may reduce the length of s.

In some aspects, the UE 120 may select a quantity of the tail suppression samples s based at least in part on a size of the data content d. In some aspects, the UE 120 may select a type (e.g., zero, non-zero, fix low-energy input, function of data symbols) of the tail suppression samples s based at least in part on the data content d. The UE 120 may select the value of the tail suppression samples s based at least in part on an interference requirement (e.g., target inter-symbol interference) and/or based at least in part on an MCS.

At the receiver (e.g., network node 110, UE 120), after FFT, a network entity (e.g., network node 110) may extract each UE signal and perform equalization and inverse DFT (IDFT) to the time domain. The network node 110 may use known GI sequences for tracking and phase noise compensation. The network node 110 may use the value of s for signal detection to minimize the overhead.

In some aspects, the UE 120 may generate a resultant communication for SC-FDE (e.g., with up-sampling). This involves an equalization operation at the receiver. The network node 110 may indicate, to the UE 120, the allocated time domain REs for the tail suppression samples s. For a lower MCS or a lower operating point, the tail suppression signal may not be needed. For a medium MCS or a medium operating point, the UE 120 may transmit a partial tail suppression signal with fewer time domain REs. For a higher MCS or a higher operating point, the UE 120 may transmit a tail suppression signal with a greater quantity of time domain REs. In some aspects, the UE 120 may select the tail suppression samples to better support a circular property for DMRS symbols than for other data symbols. The network node 110 may also indicate whether the time domain REs for the tail suppression signal can (partially) overlap with the GI signal. The UE 120 may indicate whether the UE 120 supports tail suppression signal generation or reception.

By separately inputting data, tail suppression samples, and a GI sequence into the DFT, the UE 120 (or another device acting as a transmitting device) may suppress leakage from the data to GI sequences that can be used for tracking and phase noise compensation. Complexity may also be reduced at the receiver. This may cause the UE 120 and the network node 110 to conserve processing resources and signaling resources. While generation of the GI-based waveform is described for UE 120, the network node 110 may also generate the GI-based waveform as described in connection with FIG. 8.

Examples 600, 602, and 604 show components in a transmission chain of a transmitting device. The transmitting device is a wireless communication device such as a network entity (e.g., network node 110 depicted in FIGS. 1-2) or a UE (e.g., UE 120 depicted in FIGS. 1-2). The transmitting device may communicate using a wireless link to a receiving device, which is a wireless communication device such as a network entity (e.g., network node 110) or a UE (e.g., UE 120). The transmitting device may include a DFT component that spreads an uplink shared channel, a subcarrier mapper, and an IFFT component that performs an inverse FFT to prepare the uplink shared channel or output signal for transmission. The transmitting device may also include an S/P converter and a P/S converter. The transmitting device may generate a first communication that includes a GI at a start of the first communication, data content, and tail samples at an end of the first communication. The first communication may be a single symbol of a larger communication or may include multiple symbols.

The transmitting device may concatenate, before a DFT multiplexing operation by the DFT component for the first communication, modulated samples for data content and fill samples. The fill samples may be, for example, random modulated samples, repeated data modulation samples, reference signal samples, or low energy samples (e.g., zeros). In example, 600, the header and tail may include zeroes. This may add gaps and may be easier to multiplex (ZT previous symbol). However, a zero-sample GI is not usable for tracking or channel estimation. Due to the oversampling (different DFT and IFFT size), the GIs in the IFFT output are not zero samples anymore, which introduces the imperfection on the circular property for FFT operation. The header and tail may be a unique word (UW) header or tail, such as shown by example 602. The GI may be usable for tracking or estimation. However, this may also introduce imperfection on the circular property and GI sequences may only be utilized in the IFFT domain (perform FFT, equalization, and back to IFFT). Example 604 shows a concatenation of the communications of example 600 and example 602.

Mapping subcarriers into the IFFT input can be important. Unoptimized mapping yields a very high energy at the IFFT output. A permutation (based on data length and redundancy may be used to manage the possible energy increase at the IFFT output.

As indicated above, FIG. 6 is provided as an example. Other examples may differ from what is described with regard to FIG. 6.

Figure 7:
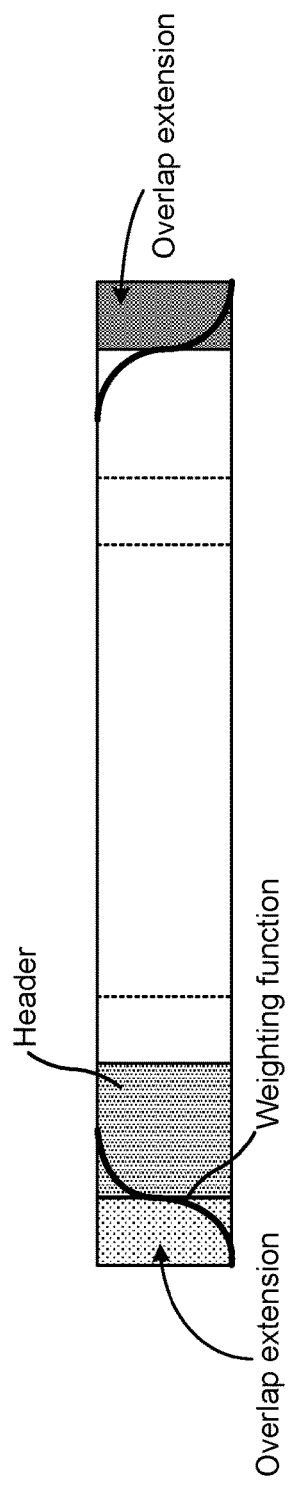
FIG. 7 is a diagram illustrating an example of a weighted overlap and add operation, in accordance with the present disclosure.

FIG. 7 is a diagram illustrating an example 700 of a weighted overlap and add operation, in accordance with the present disclosure.

A transmitted communication can leak data or energy at the ends of the communication and out of an assigned frequency band. These emissions may cause interference with other communications. One way to reduce out-of-band (OOB) emissions is to filter the OFDM symbol. One way of filtering the OFDM symbol is using TD windowing by extending a TD OFDM symbol in an operation known as "weighted overlap and add (WOLA)." Example 700 shows that a transmitting device may add overlap extensions to each end and apply a weighting function that extends through both the overlap extension and part of the header rather than just the header. The weighting function may include weights that are applied to some samples or elements (e.g., time or FFT segments) of the signal to give those elements more weight than other elements. The weighting functions at the ends of the communication smooth discontinuities between communications. To control the overlap size and hence the OOB reduction, the transmitting device may change the symbol rolloff defining the windowing function. However, this WOLA operation may exist only for CP-based waveforms and not GI-based waveforms.

As indicated above, FIG. 7 is provided as an example. Other examples may differ from what is described with regard to FIG. 7.

Figure 8:
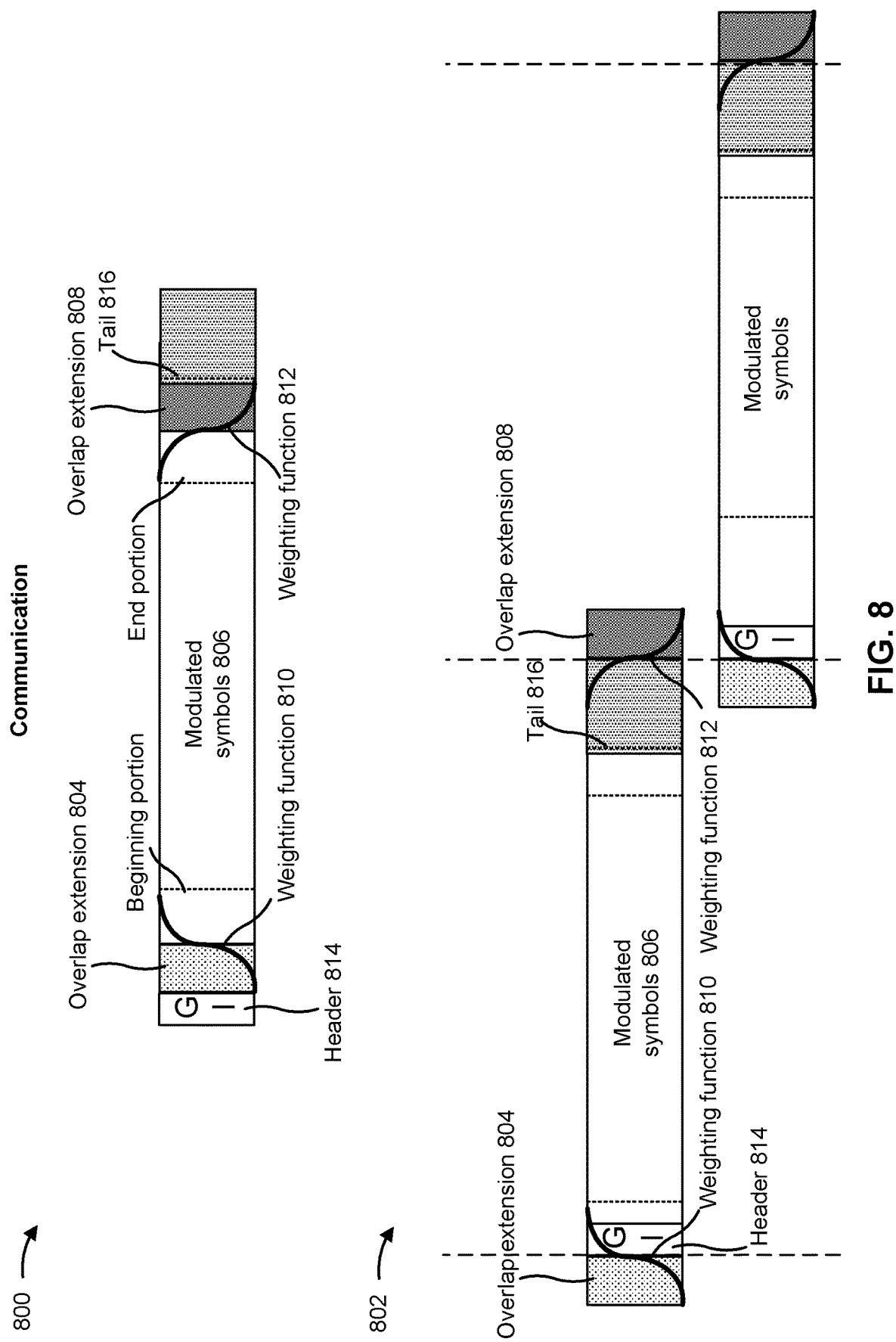
FIG. 8 is a diagram illustrating examples of windowing for GI-based waveforms, in accordance with the present disclosure.

FIG. 8 is a diagram illustrating examples 800 and 802 of windowing for GI-based waveforms, in accordance with the present disclosure.

According to various aspects described herein, TD windowing, such as WOLA with overlap extensions and weighting functions, may be used for GI-based waveforms. TD windowing may include adding soft edges to a cyclic extended OFDM symbol. A transmitting device may generate a communication from modulated symbols. The modulated symbols may form a data payload that may be part of a symbol for transmission. The communication may include a GI rather than a CP. The transmitting device (e.g., network entity, UE) may copy the first part of the symbol (including any header samples) and add this first part as an overlap extension after the symbol. In some aspects, the transmitting device may copy the last part of the symbol (including any tail samples) and add this last part as an overlap extension before the symbol. The transmitting device may apply a TD windowing with a rolloff factor (a). The rolloff factor may determine how long a weighting function is to be applied to an end of the communication.

The TD windowing may include applying a weighting function to the first part of the communication (including a header) and/or a weighting function to the last part of the communication (including a tail). In some aspects, the transmitting device may perform the TD windowing before DFT spreading for a DFT-s-OFDM waveform. A receiving device (e.g., network entity, UE) may receive the communication and remove the header, the tail, and/or any overlap extensions. The receiving device may demodulate the modulated symbols. In some aspects, an overlap extension may include data from the modulated symbols or a GI. By designing overlapping extensions for GI-based waveforms, communications with GIs may have soft edges to help prevent the loss of any data. Avoiding the loss of data conserves power, processing resources, and signaling resources that would otherwise be wasted with retransmissions for lost data.

Example 800 shows an example of windowing of a communication, where an overlap extension 804, copied or derived from an end portion of the data payload (e.g., modulated symbols 806) is added before the modulated symbols 806. An overlap extension 808, copied or derived from a beginning portion of the modulated symbols 806, is added after the modulated symbols 806. The transmitting device may apply a weighting function 810 to the first part of the communication, such as over the overlap extension 804 and at least part of the beginning portion of the modulated symbols 806. The transmitting device may apply a weighting function 812 to the last part of the communication, such as over at least part of the end portion of the modulated symbols 806 and the overlap extension 808. The transmitting device may add a header 814 (e.g., GI) before the overlap extension 804 and a tail 816 after the overlap extension 808.

In some aspects, the transmitting device may maintain the same DFT size as for a CP-based waveform and adjust the quantity of modulated symbols in the data payload to be smaller to account for extra samples needed for the rolloff. Alternatively, the transmitting device may maintain the same quantity of modulated symbols and increase the DFT size to account for the extra samples needed for the rolloff. In some aspects, the transmitting device may perform the windowing on the data and then add the header and tail. In some aspects, the transmitting device may transmit a configuration that adjusts the DFT size and/or the quantity of modulated symbols.

Example 802 shows another windowing design, where the header 814 and tail 816 are added before the overlap extensions. The overlap extension 804 in this design may be a beginning extension that is copied or derived from data from an end portion of the modulated symbols 806 and/or a GI. The overlap extension 808 in this design may be an end extension that is copied or derived from data from a beginning portion of the modulated symbols 806 and/or a GI. The transmitting device may apply the weighting functions to overlap the extensions and at least a portion of the header and/or tail. The weighting functions may also be applied to part of the modulated symbols 806. In some aspects, the overlap extension 804, the weighting function 810, the overlap extension 808, and/or the weighting function 812 may be performed after a DFT operation and/or after an IFFT operation.

As indicated above, FIG. 8 provides some examples. Other examples may differ from what is described with regard to FIG. 8.

Figure 9:
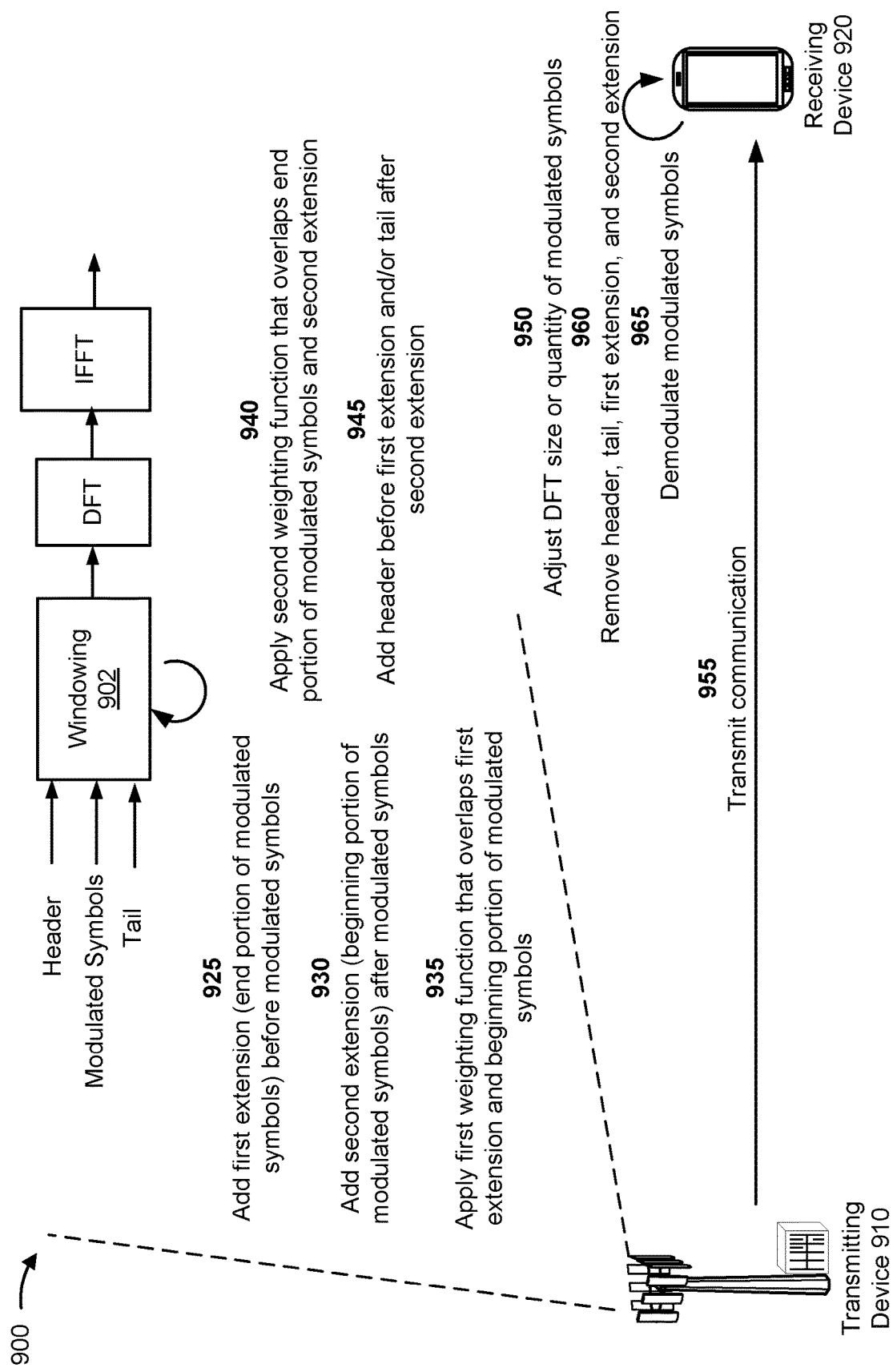
FIG. 9 is a diagram illustrating an example of windowing for a GI-based waveform, in accordance with the present disclosure.

FIG. 9 is a diagram illustrating an example 900 of windowing for a GI-based waveform, in accordance with the present disclosure. As shown in FIG. 9, a transmitting device 910 (e.g., network node 110, UE 120) and a receiving device 920 (e.g., network node 110, UE 120) may communicate with one another via a wireless network (e.g., wireless network 100).

Example 900 shows a portion of the transmit RF chain, including a DFT operation and an IFFT operation. In some aspects, the transmitting device 910 may perform windowing 902 to ends of a communication to prevent data loss at the ends of the communication. As shown by reference number 925, the transmitting device 910 may add a first extension (e.g., overlap extension 804) before the modulated symbols. The first extension may include data (copied or derived) from an end portion of the modulated symbols. As shown by reference number 930, the transmitting device 910 may add a second extension (e.g., overlap extension 808) after the modulated symbols. The second extension may include data (copied or derived) from a beginning portion of the modulated symbols. The first extension and/or the second extension may include a GI.

As shown by reference number 935, the transmitting device 910 may apply a first weighting function (e.g., weighting function 810) that overlaps the first extension and the beginning portion of the modulated symbols. As shown by reference number 940, the transmitting device 910 may apply a second weighting function (e.g., weighting function 812) that overlaps the end portion of the modulated symbols and the second extension. As shown by reference number 945, the transmitting device 910 may add a header before the first extension and/or a tail after the second extension. In some aspects, as shown by example 900, the windowing 902 may be performed before the DFT operation. This may include adding the extensions, applying the weighting functions, and/or adding the header and/or tail before the DFT operation.

In some aspects, the first weighting function and the second weighting function may be based at least in part on a rolloff factor for transitioning to the beginning portion of the modulated symbols and/or from an end portion of the modulated symbols. The rolloff factor may indicate for how much of the communication the weighting function is to apply and/or how long the transition is to take from no data to data and/or from data to no data.

The extensions, header, and/or tail may affect the size and/or makeup of the communication. As shown by reference number 950, the receiving device 920 may adjust a DFT size (and not adjust the quantity of modulated symbols in the communication) for the communication or adjust the quantity of modulated symbols (and not adjust the DFT size). The receiving device 920 may transmit an indication of the adjusted DFT size or the adjusted quantity.

In some aspects, the transmitting device 910 may transmit an indication of a type of windowing that is applied to the modulated symbols. The type of windowing may include what extensions are added, whether a header is added, whether a tail is added, and/or the order of adding extensions and applying weighting functions. The type of windowing may include whether windowing is performed before DFT or after IFFT. The indication may indicate that no windowing is to be performed. The type of windowing may be based at least in part on symbol overlap, OOB expectations, channel conditions, a capability of the receiving device 920, and/or traffic conditions.

As shown by reference number 955, the transmitting device 910 may transmit the communication. As shown by reference number 960, the receiving device 920 may remove the header, the tail, the first extension, and the second extension. As shown by reference number 965, the receiving device 920 may demodulate the modulated symbols. The receiving device 920 may further process and use the modulated symbols.

As indicated above, FIG. 9 is provided as an example. Other examples may differ from what is described with respect to FIG. 9.

Figure 10:
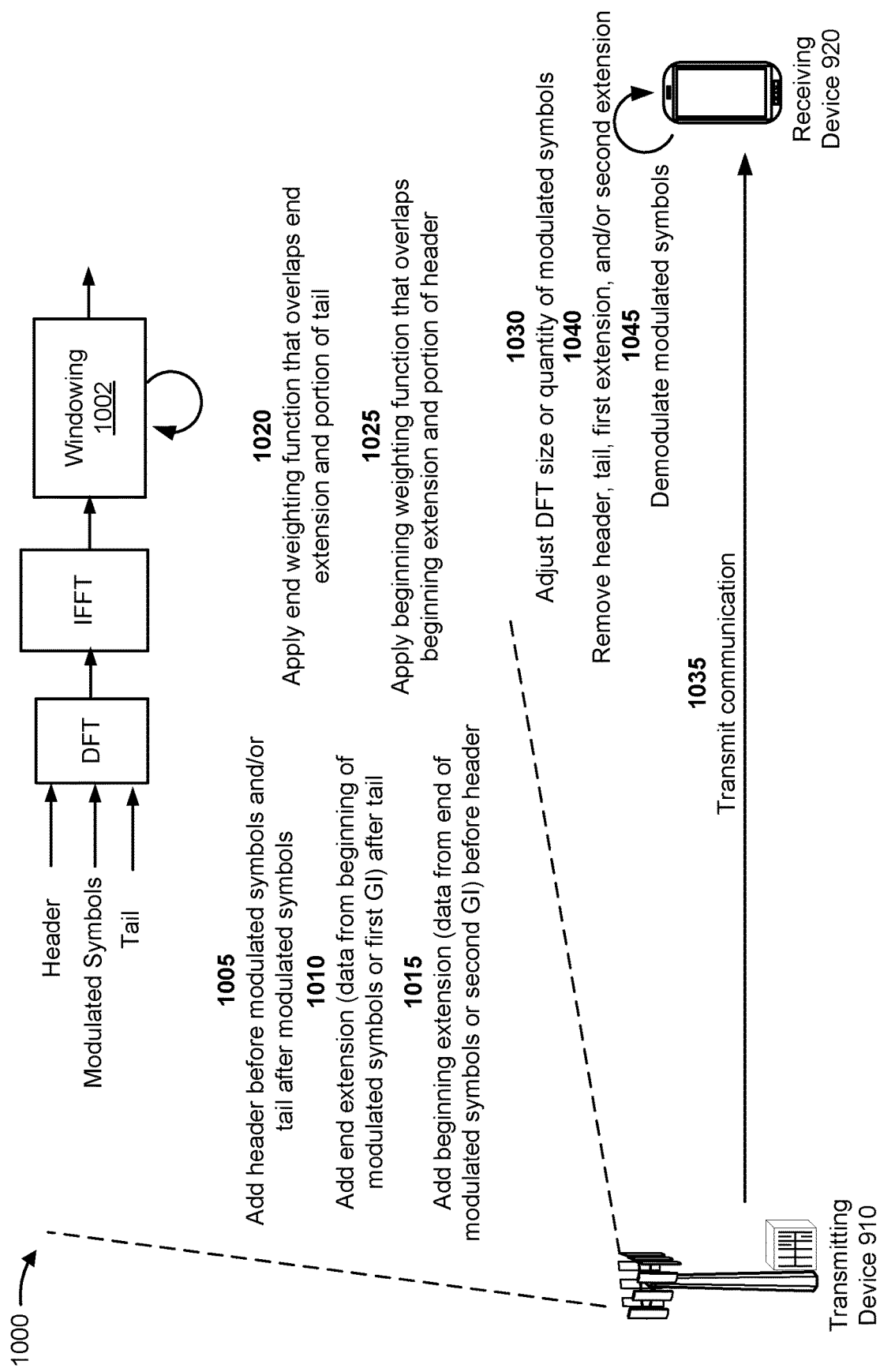
FIG. 10 is a diagram illustrating another example of windowing for a GI-based waveform, in accordance with the present disclosure.

FIG. 10 is a diagram illustrating another example 1000 of windowing for a GI-based waveform, in accordance with the present disclosure.

In some aspects, the transmitting device 910 may use a different type or order of additions in the windowing and/or how the weighting functions are applying. As shown by reference number 1005, the transmitting device 910 may add a header before modulated symbols of a communication and/or a tail after the modulated symbols. The header or the tail may be added first. As shown by reference number 1010, the transmitting device 910 may add an end extension (e.g., overlap extension 808) after the tail. The end extension may include data (copied or derived) from at least part of a beginning portion of the modulated symbols and/or a first GI. As shown by reference number 1015, the transmitting device 910 may add a beginning extension (e.g., overlap extension 804) before the header. The second extension may include data (copied or derived) from at least part of an end portion of the modulated symbols or a second GI. Either the beginning extension or the end extension may be added first or alone.

As shown by reference number 1020, the transmitting device 910 may apply an end weighting function (e.g., weighting function 812) that overlaps the end extension and at least a portion of the tail. As shown by reference number 1025, the transmitting device 910 may apply a beginning weighting function (e.g., weighting function 810) that overlaps the beginning extension and at least a portion of the header. In some aspects, as shown by example 1000, the windowing 1002 may be performed after the DFT operation and after the IFFT operation. This may include adding the extensions, applying the weighting functions, and/or adding the header and/or tail after the DFT operation and after the IFFT operation. Alternatively, in some aspects, windowing 1002 may be performed before the DFT operation. Either the beginning weighting function or the end weighting function may be applied first or alone.

The extensions, header, and/or tail may affect the size and/or makeup of the communication. As shown by reference number 1030, the receiving device 920 (and/or the transmitting device 910) may adjust a DFT size (and not adjust the quantity of modulated symbols in the communication) for the communication or adjust the quantity of modulated symbols (and not adjust the DFT size). The receiving device 920 may transmit an indication of the adjusted DFT size or the adjusted quantity. The transmitting device 910 may transmit an indication of a type of windowing that is applied to the modulated symbols.

As shown by reference number 1035, the transmitting device 910 may transmit the communication. As shown by reference number 1040, the receiving device 920 may remove the header, the tail, the first extension, and the second extension. As shown by reference number 1045, the receiving device 920 may demodulate the modulated symbols. The receiving device 920 may further process and use the modulated symbols.

As indicated above, FIG. 10 is provided as an example. Other examples may differ from what is described with respect to FIG. 10.

Figure 11:
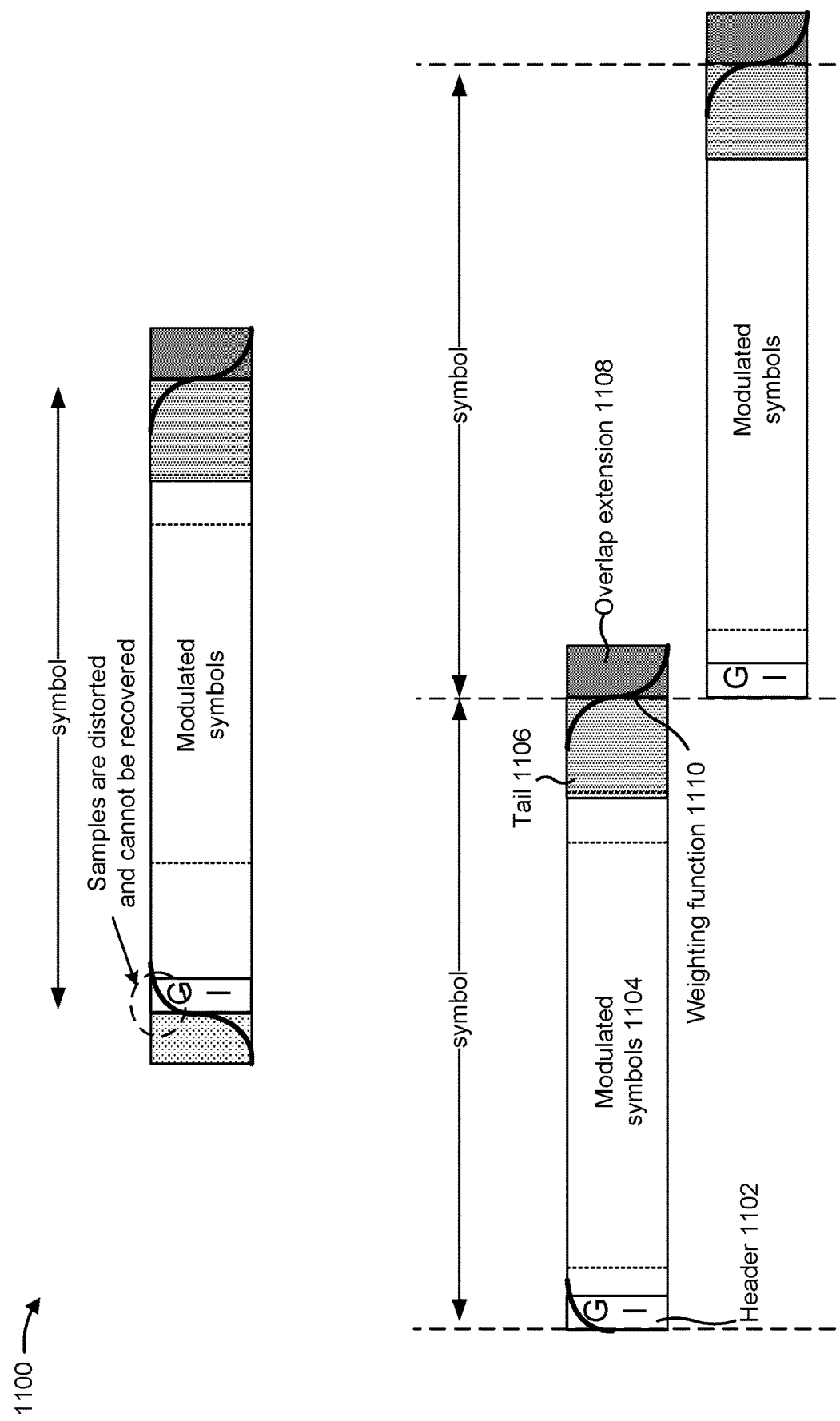
FIG. 11 is a diagram illustrating an example of windowing for GI-based waveforms, in accordance with the present disclosure.

FIG. 11 is a diagram illustrating an example 1100 of windowing for GI-based waveforms, in accordance with the present disclosure.

In some scenarios, the application of a weighting function to the first part of a communication may result in distorted samples that cannot be recovered. The communication may have a header 1102, modulated symbols 1104, and a tail 1106. In some aspects, the transmitting device 910 may not add an extension to the first part of the communication and only add an extension (e.g., overlap extension 1108) and apply a weighting function (e.g., weighting function 1110) to the last part of the communication (or to only the first part). By applying windowing to a single side, distortion of the other side may be avoided, and power and resources are conserved.

As indicated above, FIG. 11 is provided as an example. Other examples may differ from what is described with regard to FIG. 11.

Figure 12:
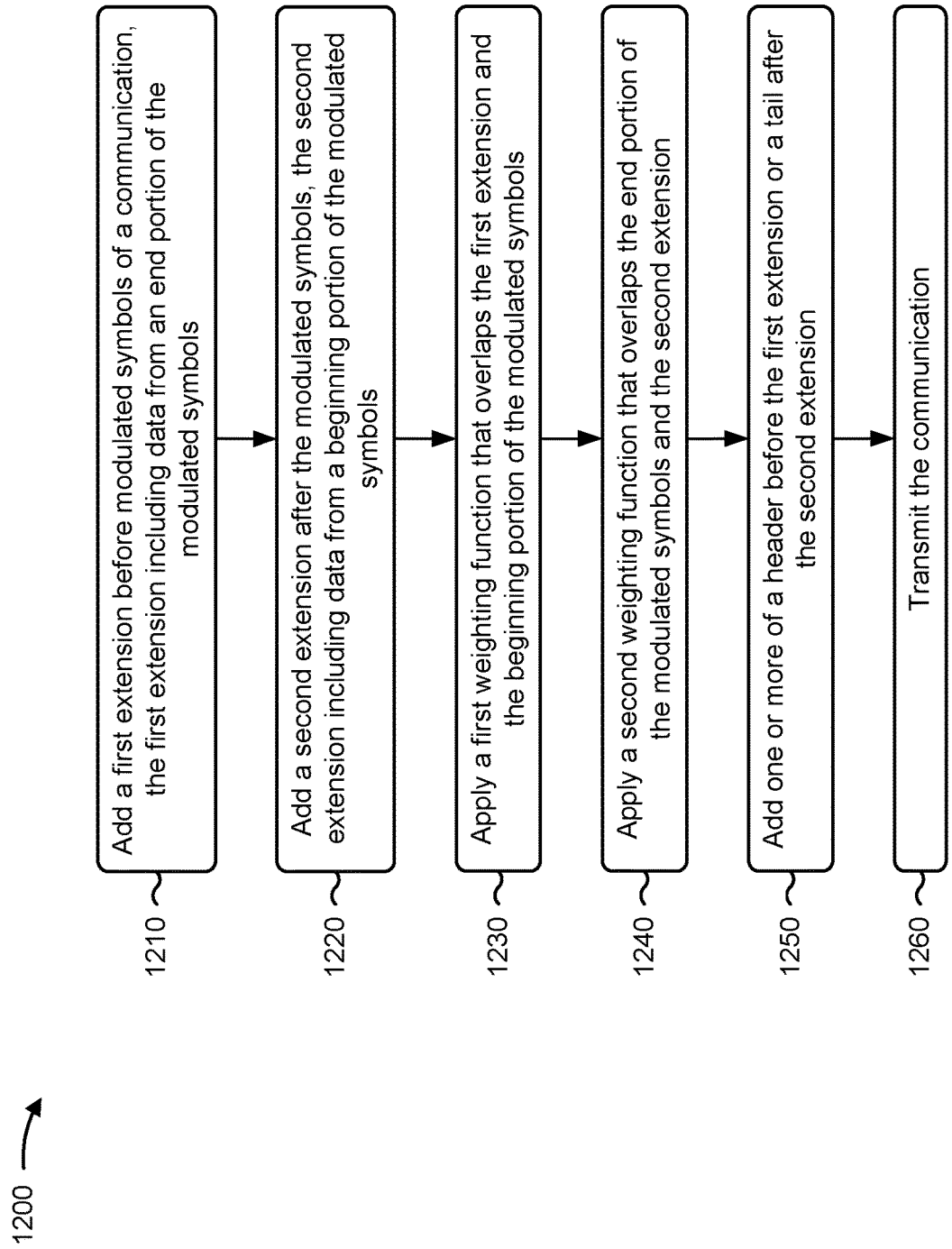
FIG. 12 is a diagram illustrating an example process performed, for example, by a transmitting device, in accordance with the present disclosure.

FIG. 12 is a diagram illustrating an example process 1200 performed, for example, by a transmitting device, in accordance with the present disclosure. Example process 1200 is an example where the transmitting device (e.g., UE 120, network node 110, transmitting device 910) performs operations associated with windowing for GI-based waveforms.

As shown in FIG. 12, in some aspects, process 1200 may include adding a first extension before modulated symbols of a communication, the first extension including data from an end portion of the modulated symbols (block 1210). For example, the transmitting device (e.g., using communication manager 1608 and/or windowing component 1610 depicted in FIG. 16) may add a first extension before modulated symbols of a communication, the first extension including data from an end portion of the modulated symbols, as described above.

As further shown in FIG. 12, in some aspects, process 1200 may include adding a second extension after the modulated symbols, the second extension including data from a beginning portion of the modulated symbols (block 1220). For example, the transmitting device (e.g., using communication manager 1608 and/or windowing component 1610 depicted in FIG. 16) may add a second extension after the modulated symbols, the second extension including data from a beginning portion of the modulated symbols, as described above.

As further shown in FIG. 12, in some aspects, process 1200 may include applying a first weighting function that overlaps the first extension and the beginning portion of the modulated symbols (block 1230). For example, the transmitting device (e.g., using communication manager 1608 and/or windowing component 1610 depicted in FIG. 16) may apply a first weighting function that overlaps the first extension and the beginning portion of the modulated symbols, as described above.

As further shown in FIG. 12, in some aspects, process 1200 may include applying a second weighting function that overlaps the end portion of the modulated symbols and the second extension (block 1240). For example, the transmitting device (e.g., using communication manager 1608 and/or windowing component 1610 depicted in FIG. 16) may apply a second weighting function that overlaps the end portion of the modulated symbols and the second extension, as described above.

As further shown in FIG. 12, in some aspects, process 1200 may include adding one or more of a header before the first extension or a tail after the second extension (block 1250). For example, the transmitting device (e.g., using communication manager 1608 and/or windowing component 1610 depicted in FIG. 16) may add one or more of a header before the first extension or a tail after the second extension, as described above.

As further shown in FIG. 12, in some aspects, process 1200 may include transmitting the communication (block 1260). For example, the transmitting device (e.g., using communication manager 1608 and/or transmission component 1604 depicted in FIG. 16) may transmit the communication, as described above.

Process 1200 may include additional aspects, such as any single aspect or any combination of aspects described below and/or in connection with one or more other processes described elsewhere herein.

In a first aspect, the adding the first extension and the adding the second extension includes adding the first extension and adding the second extension before a DFT operation.

In a second aspect, alone or in combination with the first aspect, the applying the first weighting function and the applying the second weighting function includes applying the first weighting function and applying the second weighting function before the DFT operation.

In a third aspect, alone or in combination with one or more of the first and second aspects, the adding the one or more of the header or the tail includes adding the one or more of the header or the tail before the DFT operation.

In a fourth aspect, alone or in combination with one or more of the first through third aspects, the first weighting function and the second weighting function are based at least in part on a rolloff factor for transitioning to the beginning portion of the modulated symbols and from an end portion of the modulated symbols.

In a fifth aspect, alone or in combination with one or more of the first through fourth aspects, process 1200 includes adjusting a DFT size of the communication, and transmitting an indication of the adjusted DFT size.

In a sixth aspect, alone or in combination with one or more of the first through fifth aspects, process 1200 includes adjusting a quantity of the modulated symbols, and transmitting an indication of the adjusted quantity.

In a seventh aspect, alone or in combination with one or more of the first through sixth aspects, process 1200 includes transmitting an indication of a type of windowing that is applied to the modulated symbols.

In an eighth aspect, alone or in combination with one or more of the first through seventh aspects, one or more of the first extension or the second extension include a GI.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
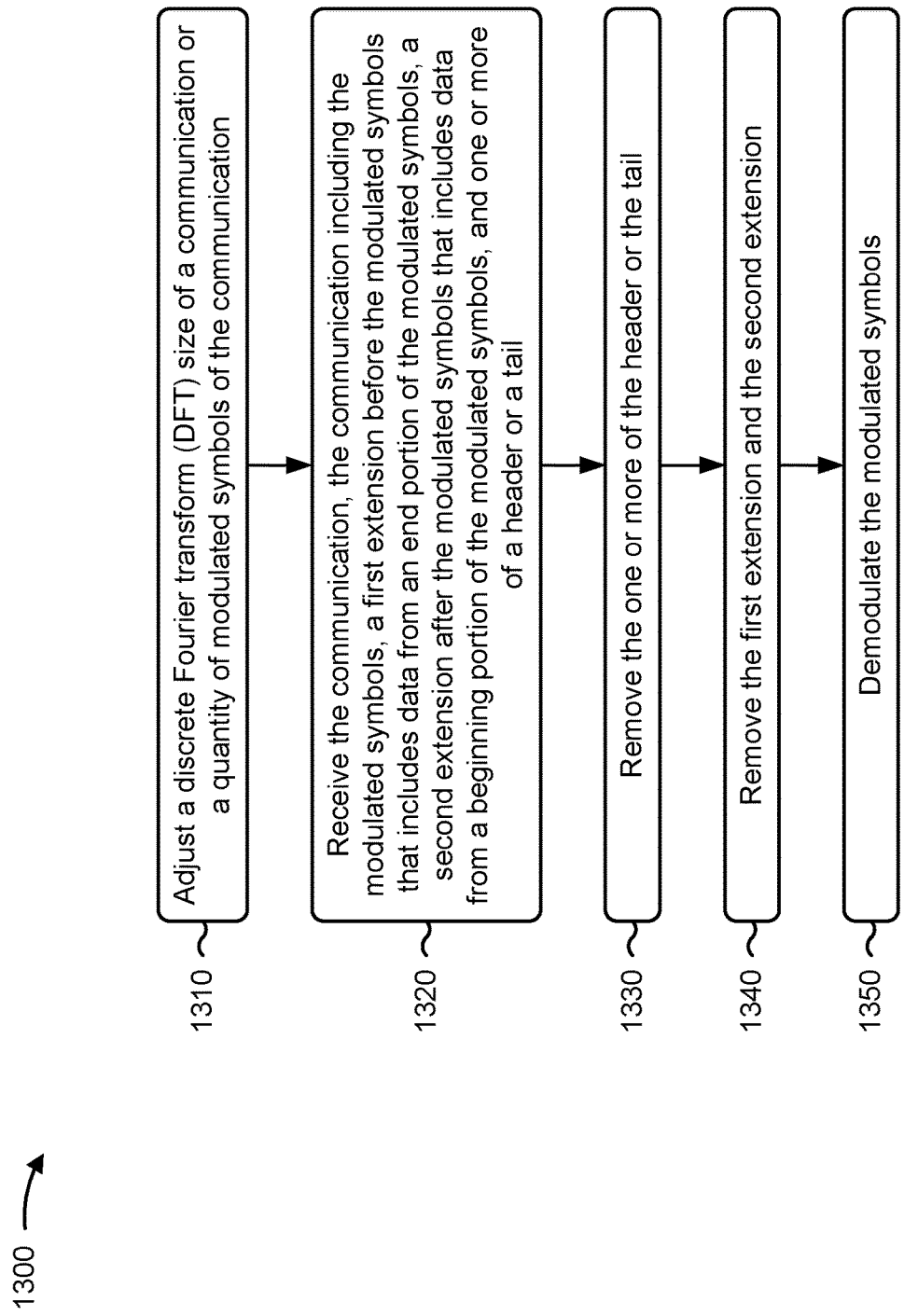
FIG. 13 is a diagram illustrating an example process performed, for example, by a receiving device, in accordance with the present disclosure.

FIG. 13 is a diagram illustrating an example process 1300 performed, for example, by a receiving device, in accordance with the present disclosure. Example process 1300 is an example where the receiving device (e.g., UE 120, network node 110, receiving device 920) performs operations associated with windowing for GI-based waveforms.

As shown in FIG. 13, in some aspects, process 1300 may include adjusting a DFT size of a communication or a quantity of modulated symbols of the communication (block 1310). For example, the receiving device (e.g., using communication manager 1708 and/or adjustment component 1710 depicted in FIG. 17) may adjust a DFT size of a communication or a quantity of modulated symbols of the communication, as described above.

As further shown in FIG. 13, in some aspects, process 1300 may include receiving the communication, the communication including the modulated symbols, a first extension before the modulated symbols that includes data from an end portion of the modulated symbols, a second extension after the modulated symbols that includes data from a beginning portion of the modulated symbols, and one or more of a header or a tail (block 1320). For example, the receiving device (e.g., using communication manager 1708 and/or reception component 1702 depicted in FIG. 17) may receive the communication, the communication including the modulated symbols, a first extension before the modulated symbols that includes data from an end portion of the modulated symbols, a second extension after the modulated symbols that includes data from a beginning portion of the modulated symbols, and one or more of a header or a tail, as described above.

As further shown in FIG. 13, in some aspects, process 1300 may include removing the one or more of the header or the tail (block 1330). For example, the receiving device (e.g., using communication manager 1708 and/or reception component 1702 depicted in FIG. 17) may remove the one or more of the header or the tail, as described above.

As further shown in FIG. 13, in some aspects, process 1300 may include removing the first extension and the second extension (block 1340). For example, the receiving device (e.g., using communication manager 1708 and/or reception component 1702 depicted in FIG. 17) may remove the first extension and the second extension, as described above.

As further shown in FIG. 13, in some aspects, process 1300 may include demodulating the modulated symbols (block 1350). For example, the receiving device (e.g., using communication manager 1708 and/or reception component 1702 depicted in FIG. 17) may demodulate the modulated symbols, as described above.

Process 1300 may include additional aspects, such as any single aspect or any combination of aspects described below and/or in connection with one or more other processes described elsewhere herein.

In a first aspect, process 1300 includes receiving an indication of a type of windowing that is applied to the modulated symbols.

In a second aspect, alone or in combination with the first aspect, one or more of the first extension or the second extension include a GI.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
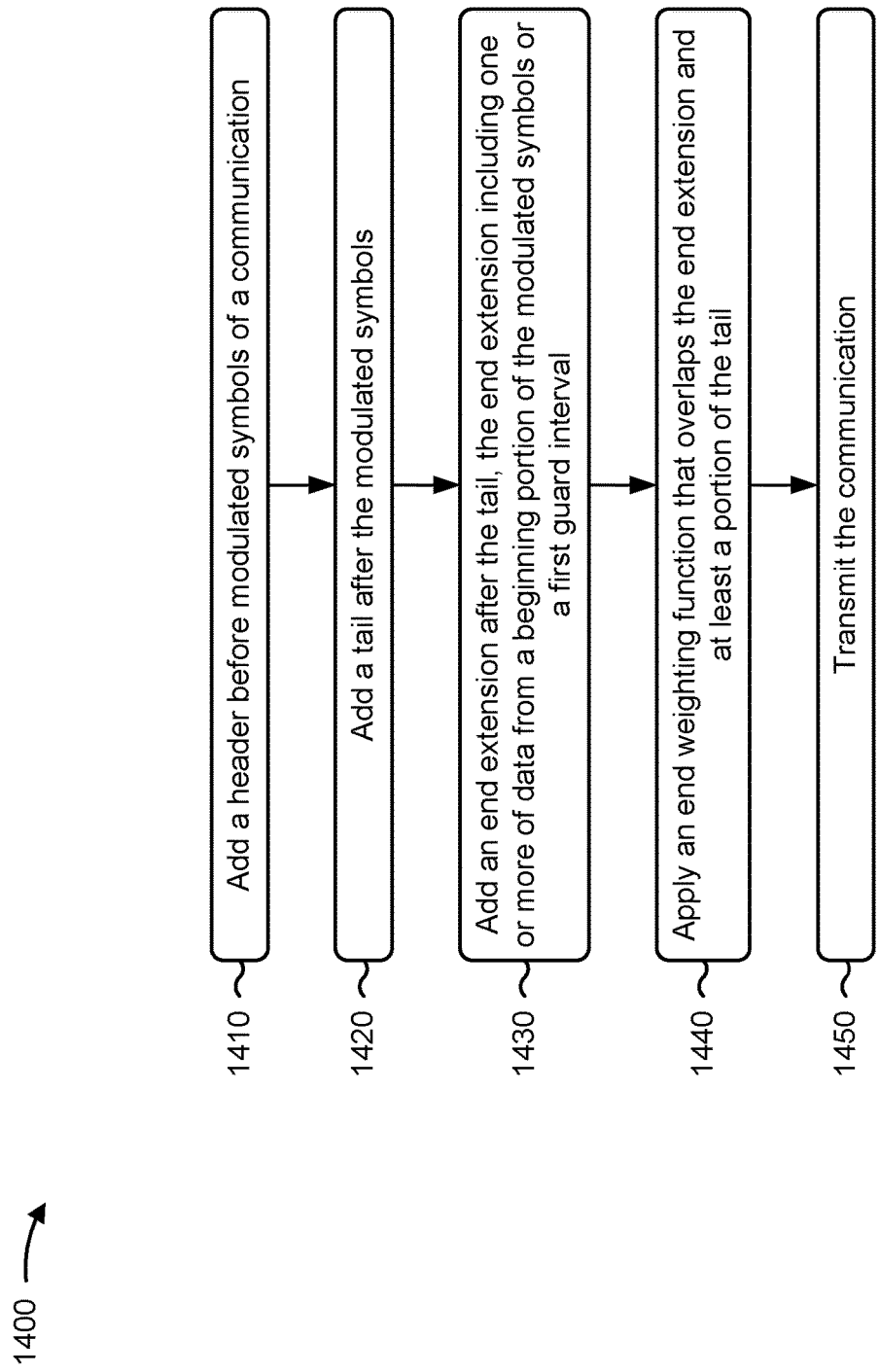
FIG. 14 is a diagram illustrating an example process performed, for example, by a transmitting device, in accordance with the present disclosure.

FIG. 14 is a diagram illustrating an example process 1400 performed, for example, by a transmitting device, in accordance with the present disclosure. Example process 1400 is an example where the transmitting device (e.g., UE 120, network node 110, transmitting device 910) performs operations associated with windowing for GI-based waveforms.

As shown in FIG. 14, in some aspects, process 1400 may include adding a header before modulated symbols of a communication (block 1410). For example, the transmitting device (e.g., using communication manager 1608 and/or windowing component 1610 depicted in FIG. 16) may add a header before modulated symbols of a communication, as described above.

As further shown in FIG. 14, in some aspects, process 1400 may include adding a tail after the modulated symbols (block 1420). For example, the transmitting device (e.g., using communication manager 1608 and/or windowing component 1610 depicted in FIG. 16) may add a tail after the modulated symbols, as described above.

As further shown in FIG. 14, in some aspects, process 1400 may include adding an end extension after the tail, the end extension including one or more of data from a beginning portion of the modulated symbols or a first GI (block 1430). For example, the transmitting device (e.g., using communication manager 1608 and/or windowing component 1610 depicted in FIG. 16) may add an end extension after the tail, the end extension including one or more of data from a beginning portion of the modulated symbols or a first GI, as described above.

As further shown in FIG. 14, in some aspects, process 1400 may include applying an end weighting function that overlaps the end extension and at least a portion of the tail (block 1440). For example, the transmitting device (e.g., using communication manager 1608 and/or windowing component 1610 depicted in FIG. 16) may apply an end weighting function that overlaps the end extension and at least a portion of the tail, as described above.

As further shown in FIG. 14, in some aspects, process 1400 may include transmitting the communication (block 1450). For example, the transmitting device (e.g., using communication manager 1608 and/or transmission component 1604 depicted in FIG. 16) may transmit the communication, as described above.

Process 1400 may include additional aspects, such as any single aspect or any combination of aspects described below and/or in connection with one or more other processes described elsewhere herein.

In a first aspect, process 1400 includes adding a beginning extension before the header, the beginning extension including one or more of data from an end portion of the modulated symbols or a second GI, and applying a beginning weighting function that overlaps the beginning extension and at least a portion of the header.

In a second aspect, alone or in combination with the first aspect, the beginning extension includes the second GI and no data.

In a third aspect, alone or in combination with one or more of the first and second aspects, the adding the end extension and the adding the end weighting function includes adding the end extension and adding the end weighting function after a DFT operation and after an IFFT operation.

In a fourth aspect, alone or in combination with one or more of the first through third aspects, the tail includes the first GI.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
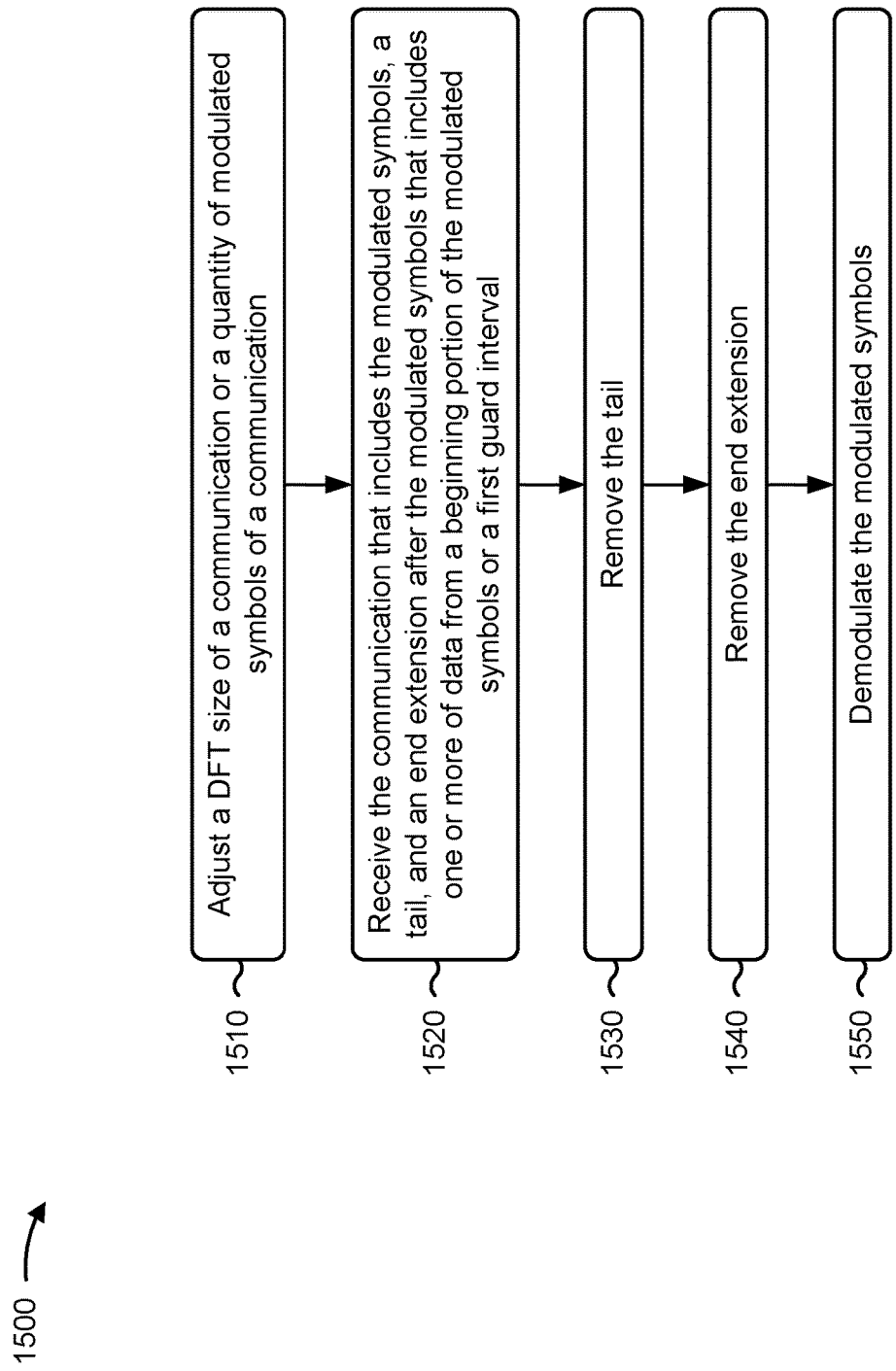
FIG. 15 is a diagram illustrating an example process performed, for example, by a receiving device, in accordance with the present disclosure.

FIG. 15 is a diagram illustrating an example process 1500 performed, for example, by a receiving device, in accordance with the present disclosure. Example process 1500 is an example where the receiving device (e.g., UE 120, network node 110, receiving device 920) performs operations associated with windowing for GI-based waveforms.

As shown in FIG. 15, in some aspects, process 1500 may include adjusting a DFT size of a communication or a quantity of modulated symbols of a communication (block 1510). For example, the receiving device (e.g., using communication manager 1708 and/or adjustment component 1710 depicted in FIG. 17) may adjust a DFT size of a communication or a quantity of modulated symbols of a communication, as described above.

As further shown in FIG. 15, in some aspects, process 1500 may include receiving the communication that includes the modulated symbols, a tail, and an end extension after the modulated symbols that includes one or more of data from a beginning portion of the modulated symbols or a first GI (block 1520). For example, the receiving device (e.g., using communication manager 1708 and/or reception component 1702 depicted in FIG. 17) may receive the communication that includes the modulated symbols, a tail, and an end extension after the modulated symbols that includes one or more of data from a beginning portion of the modulated symbols or a first GI, as described above.

As further shown in FIG. 15, in some aspects, process 1500 may include removing the tail (block 1530). For example, the receiving device (e.g., using communication manager 1708 and/or reception component 1702 depicted in FIG. 17) may remove the tail, as described above.

As further shown in FIG. 15, in some aspects, process 1500 may include removing the end extension (block 1540). For example, the receiving device (e.g., using communication manager 1708 and/or reception component 1702 depicted in FIG. 17) may remove the end extension, as described above.

As further shown in FIG. 15, in some aspects, process 1500 may include demodulating the modulated symbols (block 1550). For example, the receiving device (e.g., using communication manager 1708 and/or reception component 1702 depicted in FIG. 17) may demodulate the modulated symbols, as described above.

Process 1500 may include additional aspects, such as any single aspect or any combination of aspects described below and/or in connection with one or more other processes described elsewhere herein.

In a first aspect, the communication includes a header and a beginning extension before the modulated symbols that includes one or more of data from an end portion of the modulated symbols or a second GI, and wherein process 1500 includes removing the header and the beginning extension.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
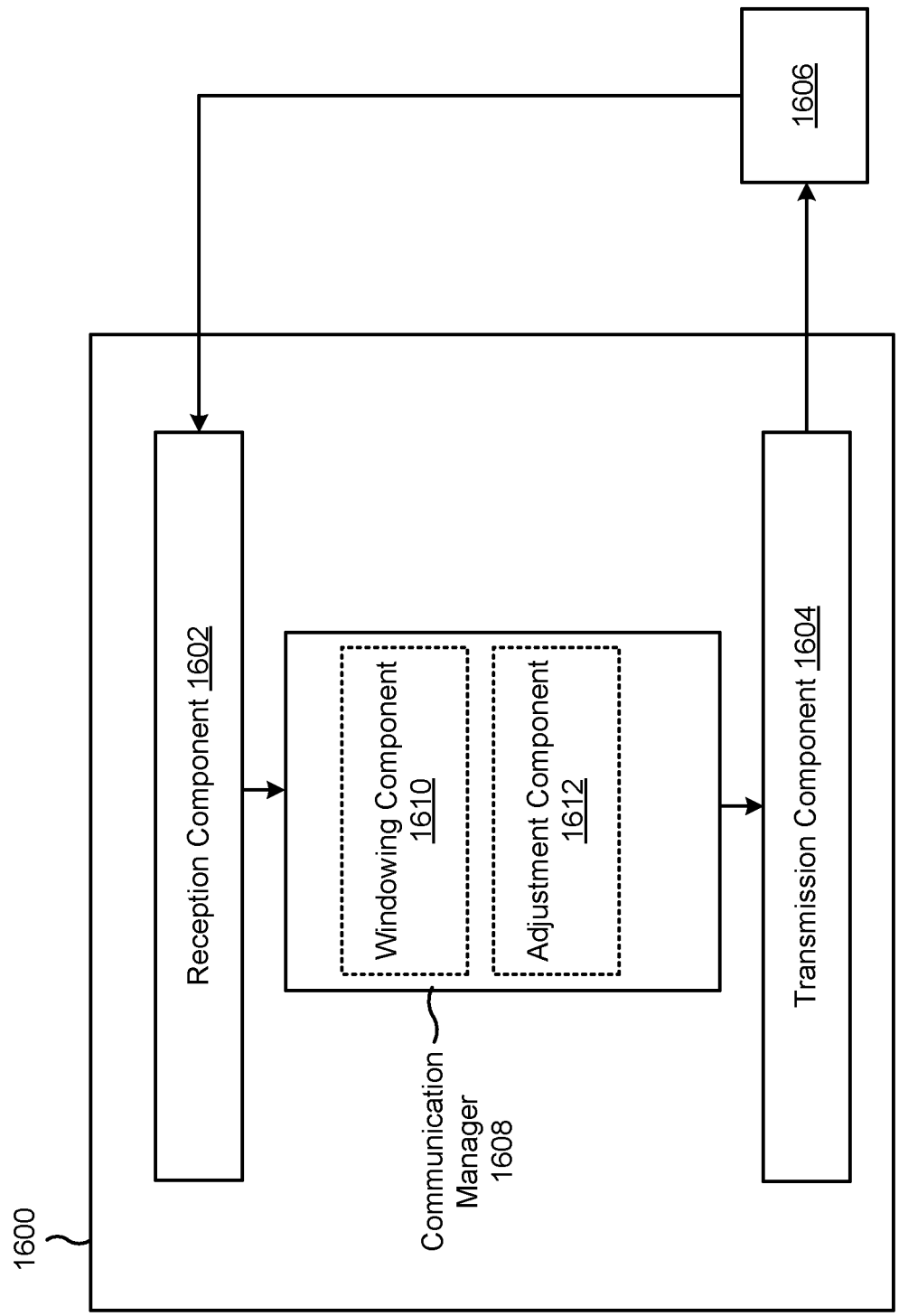
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a transmitting device (e.g., UE 120, network node 110), or a transmitting device may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, a network entity, or another wireless communication device) using the reception component 1602 and the transmission component 1604. As further shown, the apparatus 1600 may include the communication manager 1608. The communication manager 1608 may control and/or otherwise manage one or more operations of the reception component 1602 and/or the transmission component 1604. In some aspects, the communication manager 1608 may include one or more antennas, a modem, a controller/processor, a memory, or a combination thereof, of the UE or network entity described in connection with FIG. 2. The communication manager 1608 may be, or be similar to, the communication manager 140 or 150 depicted in FIGS. 1 and 2. For example, in some aspects, the communication manager 1608 may be configured to perform one or more of the functions described as being performed by the communication manager 140 or 150. In some aspects, the communication manager 1608 may include the reception component 1602 and/or the transmission component 1604. The communication manager 1608 may include a windowing component 1610 and/or an adjustment component 1612, among other examples.

In some aspects, the apparatus 1600 may be configured to perform one or more operations described herein in connection with FIGS. 1-15. Additionally, or alternatively, the apparatus 1600 may be configured to perform one or more processes described herein, such as process 1200 of FIG. 12, process 1400 of FIG. 14, or a combination thereof. In some aspects, the apparatus 1600 and/or one or more components shown in FIG. 16 may include one or more components of the transmitting device described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the transmitting device described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the transmitting device described in connection with FIG. 2. In some aspects, the transmission component 1604 may be co-located with the reception component 1602 in a transceiver.

In some aspects, the windowing component 1610 may add a first extension before modulated symbols of a communication, the first extension including data from an end portion of the modulated symbols. The windowing component 1610 may add a second extension after the modulated symbols, the second extension including data from a beginning portion of the modulated symbols. The windowing component 1610 may apply a first weighting function that overlaps the first extension and the beginning portion of the modulated symbols. The windowing component 1610 may apply a second weighting function that overlaps the end portion of the modulated symbols and the second extension. The windowing component 1610 may add one or more of a header before the first extension or a tail after the second extension. The transmission component 1604 may transmit the communication.

The adjustment component 1612 may adjust a DFT size of the communication.

The transmission component 1604 may transmit an indication of the adjusted DFT size. The adjustment component 1612 may adjust a quantity of the modulated symbols. The transmission component 1604 may transmit an indication of the adjusted quantity. The transmission component 1604 may transmit an indication of a type of windowing that is applied to the modulated symbols.

In some aspects, the windowing component 1610 may add a header before modulated symbols of a communication. The windowing component 1610 may add a tail after the modulated symbols. The windowing component 1610 may add an end extension after the tail, the end extension including one or more of data from a beginning portion of the modulated symbols or a first GI. The windowing component 1610 may apply an end weighting function that overlaps the end extension and at least a portion of the tail. The transmission component 1604 may transmit the communication.

The windowing component 1610 may add a beginning extension before the header, the beginning extension including one or more of data from an end portion of the modulated symbols or a second GI. The windowing component 1610 may apply a beginning weighting function that overlaps the beginning extension and at least a portion of the header.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

Figure 17:
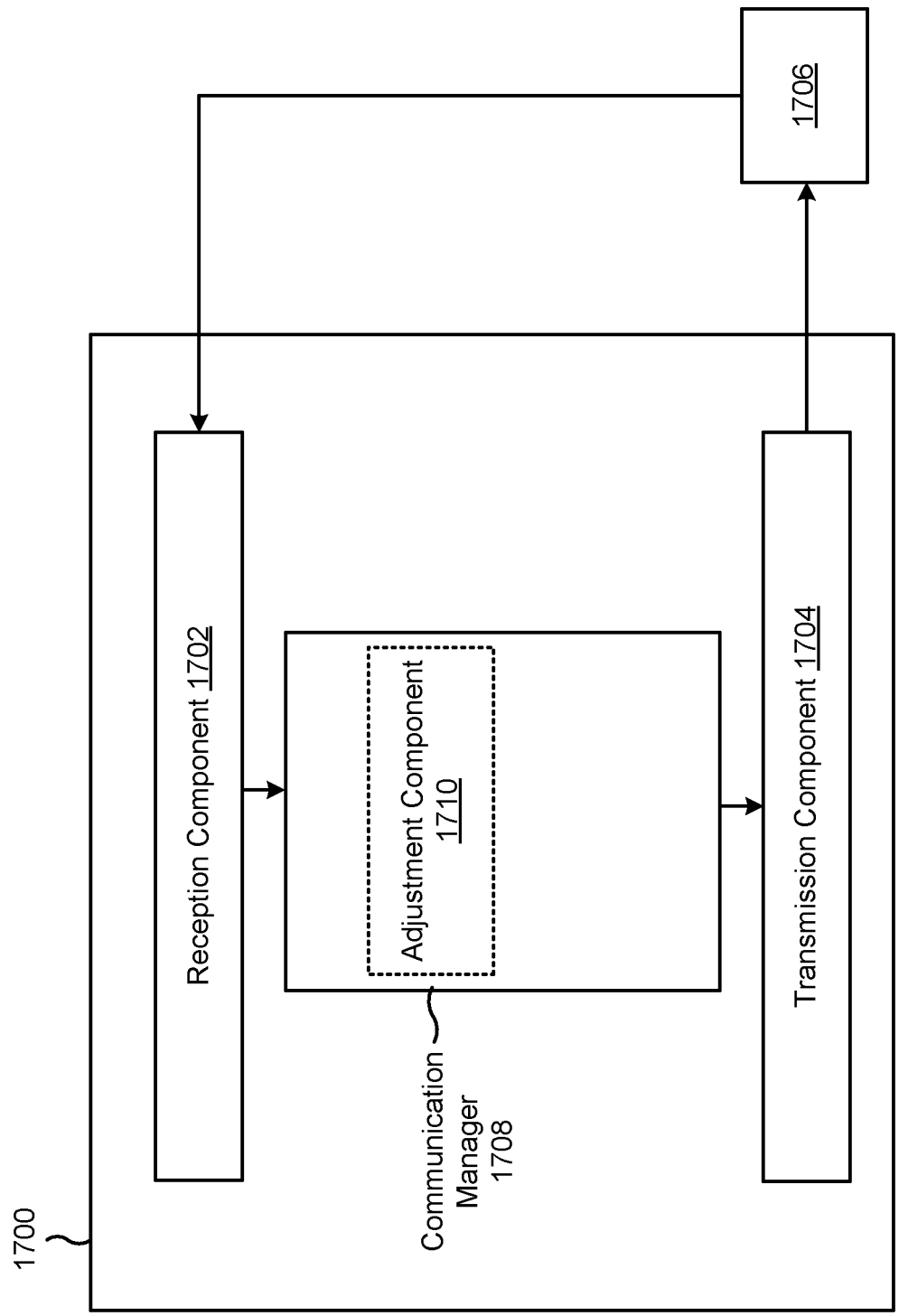
FIG. 17 is a diagram of an example apparatus for wireless communication, in accordance with the present disclosure.

FIG. 17 is a diagram of an example apparatus 1700 for wireless communication, in accordance with the present disclosure. The apparatus 1700 may be a receiving device (e.g., UE 120, network node 110), or a receiving device may include the apparatus 1700. In some aspects, the apparatus 1700 includes a reception component 1702 and a transmission component 1704, which may be in communication with one another (for example, via one or more buses and/or one or more other components). As shown, the apparatus 1700 may communicate with another apparatus 1706 (such as a UE, a base station, network entity, or another wireless communication device) using the reception component 1702 and the transmission component 1704. As further shown, the apparatus 1700 may include the communication manager 1708. The communication manager 1708 may control and/or otherwise manage one or more operations of the reception component 1702 and/or the transmission component 1704. In some aspects, the communication manager 1708 may include one or more antennas, a modem, a controller/processor, a memory, or a combination thereof, of the network entity described in connection with FIG. 2. The communication manager 1708 may be, or be similar to, the communication manager 140 or 150 depicted in FIGS. 1 and 2. For example, in some aspects, the communication manager 1708 may be configured to perform one or more of the functions described as being performed by the communication manager 140 or 150. In some aspects, the communication manager 1708 may include the reception component 1702 and/or the transmission component 1704. The communication manager 1708 may include an adjustment component 1710, among other examples.

In some aspects, the apparatus 1700 may be configured to perform one or more operations described herein in connection with FIGS. 1-11. Additionally, or alternatively, the apparatus 1700 may be configured to perform one or more processes described herein, such as process 1300 of FIG. 13, process 1500 of FIG. 15, or a combination thereof. In some aspects, the apparatus 1700 and/or one or more components shown in FIG. 17 may include one or more components of the receiving device described in connection with FIG. 2. Additionally, or alternatively, one or more components shown in FIG. 17 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1702 may receive communications, such as reference signals, control information, data communications, or a combination thereof, from the apparatus 1706. The reception component 1702 may provide received communications to one or more other components of the apparatus 1700. In some aspects, the reception component 1702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1700. In some aspects, the reception component 1702 may include one or more antennas, a modem, a demodulator, a MIMO detector, a receive processor, a controller/processor, a memory, or a combination thereof, of the receiving device described in connection with FIG. 2.

The transmission component 1704 may transmit communications, such as reference signals, control information, data communications, or a combination thereof, to the apparatus 1706. In some aspects, one or more other components of the apparatus 1700 may generate communications and may provide the generated communications to the transmission component 1704 for transmission to the apparatus 1706. In some aspects, the transmission component 1704 may perform signal processing on the generated communications (such as filtering, amplification, modulation, digital-to-analog conversion, multiplexing, interleaving, mapping, or encoding, among other examples), and may transmit the processed signals to the apparatus 1706. In some aspects, the transmission component 1704 may include one or more antennas, a modem, a modulator, a transmit MIMO processor, a transmit processor, a controller/processor, a memory, or a combination thereof, of the receiving device described in connection with FIG. 2. In some aspects, the transmission component 1704 may be co-located with the reception component 1702 in a transceiver.

In some aspects, the adjustment component 1710 may adjust a DFT size of a communication or a quantity of modulated symbols of the communication. The reception component 1702 may receive the communication, the communication including the modulated symbols, a first extension before the modulated symbols that includes data from an end portion of the modulated symbols, a second extension after the modulated symbols that includes data from a beginning portion of the modulated symbols, and one or more of a header or a tail. The reception component 1702 may remove the one or more of the header or the tail. The reception component 1702 may remove the first extension and the second extension. The reception component 1702 may demodulate the modulated symbols. The reception component 1702 may receive an indication of a type of windowing that is applied to the modulated symbols.

In some aspects, the adjustment component 1710 may adjust a DFT size of a communication or a quantity of modulated symbols of a communication. The reception component 1702 may receive the communication that includes the modulated symbols, a tail, and an end extension after the modulated symbols that includes one or more of data from a beginning portion of the modulated symbols or a first GI. The reception component 1702 may remove the tail. The reception component 1702 may remove the end extension. The reception component 1702 may demodulate the modulated symbols.

The number and arrangement of components shown in FIG. 17 are provided as an example. In practice, there may be additional components, fewer components, different components, or differently arranged components than those shown in FIG. 17. Furthermore, two or more components shown in FIG. 17 may be implemented within a single component, or a single component shown in FIG. 17 may be implemented as multiple, distributed components. Additionally, or alternatively, a set of (one or more) components shown in FIG. 17 may perform one or more functions described as being performed by another set of components shown in FIG. 17.

The following provides an overview of some Aspects of the present disclosure:

Aspect 1: A method of wireless communication performed by a transmitting device, comprising: adding a first extension before modulated symbols of a communication, the first extension including data from an end portion of the modulated symbols; adding a second extension after the modulated symbols, the second extension including data from a beginning portion of the modulated symbols; applying a first weighting function that overlaps the first extension and the beginning portion of the modulated symbols; applying a second weighting function that overlaps the end portion of the modulated symbols and the second extension; adding one or more of a header before the first extension or a tail after the second extension; and transmitting the communication.

Aspect 2: The method of Aspect 1, wherein the adding the first extension and the adding the second extension includes adding the first extension and adding the second extension before a discrete Fourier transform (DFT) operation.

Aspect 3: The method of Aspect 2, wherein the applying the first weighting function and the applying the second weighting function includes applying the first weighting function and applying the second weighting function before the DFT operation.

Aspect 4: The method of Aspect 3, wherein the adding the one or more of the header or the tail includes adding the one or more of the header or the tail before the DFT operation.

Aspect 5: The method of any of Aspects 1-4, wherein the first weighting function and the second weighting function are based at least in part on a rolloff factor for transitioning to the beginning portion of the modulated symbols and from an end portion of the modulated symbols.

Aspect 6: The method of any of Aspects 1-5, further comprising: adjusting a discrete Fourier transform (DFT) size of the communication; and transmitting an indication of the adjusted DFT size.

Aspect 7: The method of any of Aspects 1-6, further comprising: adjusting a quantity of the modulated symbols; and transmitting an indication of the adjusted quantity.

Aspect 8: The method of any of Aspects 1-7, further comprising transmitting an indication of a type of windowing that is applied to the modulated symbols.

Aspect 9: The method of any of Aspects 1-8, wherein one or more of the first extension or the second extension include a guard interval.

Aspect 10: A method of wireless communication performed by a receiving device, comprising: adjusting a discrete Fourier transform (DFT) size of a communication or a quantity of modulated symbols of the communication; receiving the communication, the communication including the modulated symbols, a first extension before the modulated symbols that includes data from an end portion of the modulated symbols, a second extension after the modulated symbols that includes data from a beginning portion of the modulated symbols, and one or more of a header or a tail; removing the one or more of the header or the tail; removing the first extension and the second extension; and demodulating the modulated symbols.

Aspect 11: The method of Aspect 10, further comprising receiving an indication of a type of windowing that is applied to the modulated symbols.

Aspect 12: The method of any of Aspects 10-11, wherein one or more of the first extension or the second extension include a guard interval.

Aspect 13: A method of wireless communication performed by a transmitting device, comprising: adding a header before modulated symbols of a communication; adding a tail after the modulated symbols; adding an end extension after the tail, the end extension including one or more of data from a beginning portion of the modulated symbols or a first guard interval; applying an end weighting function that overlaps the end extension and at least a portion of the tail; and transmitting the communication.

Aspect 14: The method of Aspect 13, further comprising: adding a beginning extension before the header, the beginning extension including one or more of data from an end portion of the modulated symbols or a second guard interval; and applying a beginning weighting function that overlaps the beginning extension and at least a portion of the header.

Aspect 15: The method of Aspect 14, wherein the beginning extension includes the second guard interval and no data.

Aspect 16: The method of any of Aspects 13-15, wherein the adding the end extension and the adding the end weighting function includes adding the end extension and adding the end weighting function after a discrete Fourier transform operation and after an inverse fast Fourier transform operation.

Aspect 17: The method of any of Aspects 13-16, wherein the tail includes the first guard interval.

Aspect 18: A method of wireless communication performed by a receiving device, comprising: adjusting a discrete Fourier transform (DFT) size of a communication or a quantity of modulated symbols of a communication; receiving the communication that includes the modulated symbols, a tail, and an end extension after the modulated symbols that includes one or more of data from a beginning portion of the modulated symbols or a first guard interval; removing the tail; removing the end extension; and demodulating the modulated symbols.

Aspect 19: The method of Aspect 18, wherein the communication includes a header and a beginning extension before the modulated symbols that includes one or more of data from an end portion of the modulated symbols or a second guard interval, and wherein the method includes removing the header and the beginning extension.

Aspect 20: An apparatus for wireless communication at a device, comprising a processor; memory coupled with the processor; and instructions stored in the memory and executable by the processor to cause the apparatus to perform the method of one or more of Aspects 1-19.

Aspect 21: A device for wireless communication, comprising a memory and one or more processors coupled to the memory, the one or more processors configured to perform the method of one or more of Aspects 1-19.

Aspect 22: An apparatus for wireless communication, comprising at least one means for performing the method of one or more of Aspects 1-19.

Aspect 23: A non-transitory computer-readable medium storing code for wireless communication, the code comprising instructions executable by a processor to perform the method of one or more of Aspects 1-19.

Aspect 24: A non-transitory computer-readable medium storing a set of instructions for wireless communication, the set of instructions comprising one or more instructions that, when executed by one or more processors of a device, cause the device to perform the method of one or more of Aspects 1-19.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitting device for wireless communication, comprising:
   memory; and
   one or more processors coupled to the memory, the memory comprising instructions executable by the one or more processors to cause the transmitting device to:

add a first extension before modulated symbols of a communication, the first extension including data from an end portion of the modulated symbols;
add a second extension after the modulated symbols, the second extension including data from a beginning portion of the modulated symbols;
apply a first weighting function that overlaps the first extension and the beginning portion of the modulated symbols;
apply a second weighting function that overlaps the end portion of the modulated symbols and the second extension;
add at least one of: a header before the first extension or a tail after the second extension; and
transmit the communication.

2. The transmitting device of claim 1, wherein the memory includes instructions executable by the one or more processors to cause the transmitting device to, when adding the first extension and the adding the second extension, add the first extension before a discrete Fourier transform (DFT) operation and add the second extension before the DFT operation before a discrete Fourier transform (DFT) operation.

3. The transmitting device of claim 2, wherein the memory includes instructions executable by the one or more processors to cause the transmitting device to, when applying the first weighting function and the applying the second weighting function, apply the first weighting function before the DFT operation and apply the second weighting function before the DFT operation.

4. The transmitting device of claim 3, wherein the memory includes instructions executable by the one or more processors to cause the transmitting device to, when adding the at least one or more of the header or the tail, add the one or more of: the header before the DFT operation or the tail before the DFT operation.

5. The transmitting device of claim 1, wherein the first weighting function and the second weighting function are based at least in part on a rolloff factor for transitioning to the beginning portion of the modulated symbols and from an end portion of the modulated symbols.

6. The transmitting device of claim 1, wherein the memory further comprises instructions executable by the one or more processors to cause the transmitting device to:
adjust a discrete Fourier transform (DFT) size of the communication; and
transmit an indication of the adjusted DFT size.

7. The transmitting device of claim 1, wherein the memory further comprises instructions executable by the one or more processors to cause the transmitting device to:
adjust a quantity of the modulated symbols; and
transmit an indication of the adjusted quantity.

8. The transmitting device of claim 1, wherein the memory further comprises instructions executable by the one or more processors to cause the transmitting device to transmit an indication of a type of windowing that is applied to the modulated symbols.

9. The transmitting device of claim 1, wherein at least one of: one or more of the first extension includes a guard interval, or the second extension includes a guard interval.

10. A receiving device for wireless communication, comprising:
memory; and
one or more processors coupled to the memory, the memory comprising instructions executable by the one or more processors to cause the receiving device to:
adjust a discrete Fourier transform (DFT) size of a communication or a quantity of modulated symbols of the communication;
receive the communication, the communication including the modulated symbols, a first extension before the modulated symbols that includes data from an end portion of the modulated symbols, a second extension after the modulated symbols that includes data from a beginning portion of the modulated symbols, and at least one of: a header or a tail;
remove the one or more of: the header or the tail;
remove the first extension and the second extension; and
demodulate the modulated symbols.

11. The receiving device of claim 10, wherein the memory further comprises instructions executable by the one or more processors to cause the receiving device to receive an indication of a type of windowing that is applied to the modulated symbols.

12. The receiving device of claim 10, wherein at least one of: the first extension includes a guard interval, or the second extension includes a guard interval.

13. A transmitting device for wireless communication, comprising:
memory; and
one or more processors coupled to the memory, the memory comprising instructions executable by the one or more processors to cause the transmitting device to:
add a header before modulated symbols of a communication;
add a tail after the modulated symbols;
add an end extension after the tail, the end extension including at least one of: first guard interval, or data from an end portion of the modulated symbols; one or more of data from a beginning portion of the modulated symbols or a first guard interval;
apply an end weighting function that overlaps the end extension and at least a portion of the tail; and
transmit the communication.

14. The transmitting device of claim 13, wherein the memory further comprises instructions executable by the one or more processors to cause the transmitting device to:
add a beginning extension before the header, the beginning extension including at least one of: a second guard interval, or data from an end portion of the modulated symbols; one or more of data from an end portion of the modulated symbols or a second guard interval; and
apply a beginning weighting function that overlaps the beginning extension and at least a portion of the header.

15. The transmitting device of claim 14, wherein the beginning extension includes the second guard interval and no data.

16. The transmitting device of claim 13, wherein the memory includes instructions executable by the one or more processors to cause the transmitting device to, when adding the end extension and the adding the end weighting function, add the end extension and add the end weighting function after a discrete Fourier transform operation and after an inverse fast Fourier transform operation.

17. The transmitting device of claim 13, wherein the tail includes the first guard interval.

18. A receiving device for wireless communication, comprising:
memory; and
one or more processors coupled to the memory, the memory comprising instructions executable by the one or more processors to cause the receiving device to:

adjust a discrete Fourier transform (DFT) size of a communication or a quantity of modulated symbols of a communication;
receive the communication that includes the modulated symbols, a tail, and an end extension after the modulated symbols that includes at least one of: a first guard interval, or data from a beginning portion of the modulated symbols; one or more of data from a beginning portion of the modulated symbols or a first guard interval;
remove the tail;
remove the end extension; and
demodulate the modulated symbols.

19. The receiving device of claim 18, wherein the communication includes a header before the modulated symbols and a beginning extension before the modulated symbols that includes at least one of: a second guard interval, or data from an end portion of the modulated symbols, one or more of data from an end portion of the modulated symbols or a second guard interval, and wherein the memory includes instructions executable by the one or more processors to cause the receiving device to remove the header and the beginning extension.

* * * * *